(12) United States Patent (10) Patent No.: US 9,293,025 B2
Zhang (45) Date of Patent: Mar. 22, 2016

(54) EMERGENCY DETECTION AND ALERT APPARATUS WITH FLOOR ELEVATION LEARNING CAPABILITIES

(71) Applicant: Jack Ke Zhang, Ijamsville, MD (US)

(72) Inventor: Jack Ke Zhang, Ijamsville, MD (US)

( * ) Notice: Subject to any disclaimer, the term of this patent is extended or adjusted under 35 U.S.C. 154(b) by 0 days.

(21) Appl. No.: 14/591,782

(22) Filed: Jan. 7, 2015

(65) Prior Publication Data

US 2015/0269826 A1 Sep. 24, 2015

Related U.S. Application Data

(63) Continuation of application No. 14/218,888, filed on Mar. 18, 2014, now Pat. No. 8,952,818.

(51) Int. Cl.
*G08B 1/08* (2006.01)
*G08B 21/04* (2006.01)

(52) U.S. Cl.
CPC .......... *G08B 21/0446* (2013.01); *G08B 21/043* (2013.01); *G08B 21/0453* (2013.01); *G08B 21/0492* (2013.01)

(58) Field of Classification Search
CPC ...... G01C 21/28; A61B 5/1117; G08B 21/22; G06F 1/206
USPC ............ 340/539.12, 539.22, 506, 531, 573.1, 340/573.4, 540, 541; 701/300, 468, 525
See application file for complete search history.

(56) References Cited

U.S. PATENT DOCUMENTS

| | | | |
|---|---|---|---|
| 5,827,180 A | 10/1998 | Goodman et al. | |
| 6,075,755 A | 6/2000 | Zarchan | |
| 6,443,906 B1 | 9/2002 | Ting et al. | |
| 7,162,368 B2 * | 1/2007 | Levi et al. | 701/300 |
| 7,242,306 B2 | 7/2007 | Wildman et al. | |
| 7,285,090 B2 | 10/2007 | Stivoric et al. | |
| 8,217,795 B2 | 7/2012 | Carlton-Foss | |

(Continued)

FOREIGN PATENT DOCUMENTS

JP 2007505412 3/2007
KR 1020020013214 2/2002

OTHER PUBLICATIONS

U.S. Appl. No. 14/218,821, filed Mar. 18, 2014, Titled: Techniques for Monitoring Prescription Compliance Using a Body-Worn Device.

(Continued)

*Primary Examiner* — Tai T Nguyen
(74) *Attorney, Agent, or Firm* — Kilpatrick Townsend & Stockon LLP

(57) ABSTRACT

A device that can facilitate monitoring a wearer of the device and alerting emergency personnel of an emergent event can comprise a first sensor configured to generate elevation data that represents an elevation of the device, a second sensor configured to collect vital sign data of the wearer, and a third sensor configured to generate a geographic position of the device. The device also includes a processor configured to determine an elevation of a floor, and a floor location of the device. The processor is also configured to detect an emergent event affecting the wearer based on the first or second sensor. The device also includes a transmitter configured to transmit an initial alert in response to detecting an emergent event. The transmitter also configured to transmit a secondary alert in response to generating the geographic position and determining the floor location of the device within a pre-set time period of the emergent event.

20 Claims, 14 Drawing Sheets

(56) References Cited

U.S. PATENT DOCUMENTS

| | | |
|---|---|---|
| 8,457,367 B1 | 6/2013 | Nechyba et al. |
| 8,461,988 B2 | 6/2013 | Tran |
| 8,708,903 B2 | 4/2014 | Tran |
| 8,952,818 B1 | 2/2015 | Zhang |
| 2002/0026330 A1 | 2/2002 | Klein et al. |
| 2003/0052787 A1 | 3/2003 | Zerhusen et al. |
| 2003/0060721 A1 | 3/2003 | Nakazawa et al. |
| 2003/0176815 A1 | 9/2003 | Baba et al. |
| 2003/0212379 A1 | 11/2003 | Bylund et al. |
| 2004/0077934 A1 | 4/2004 | Massad |
| 2005/0089197 A1 | 4/2005 | Iwasaki et al. |
| 2005/0101845 A1 | 5/2005 | Nihtila et al. |
| 2007/0197878 A1 | 8/2007 | Shklarski et al. |
| 2007/0257636 A1 | 11/2007 | Phillips et al. |
| 2008/0086318 A1 | 4/2008 | Gilley et al. |
| 2008/0129518 A1 | 6/2008 | Carlton-Foss et al. |
| 2008/0162192 A1 | 7/2008 | Vonk et al. |
| 2008/0266118 A1 | 10/2008 | Pierson et al. |
| 2009/0187121 A1 | 7/2009 | Evans et al. |
| 2009/0252311 A1 | 10/2009 | Kuiken |
| 2009/0318779 A1 | 12/2009 | Tran |
| 2009/0322513 A1 | 12/2009 | Hwang et al. |
| 2009/0322540 A1 | 12/2009 | Richardson et al. |
| 2009/0322548 A1 | 12/2009 | Gottlieb et al. |
| 2010/0010428 A1 | 1/2010 | Yu et al. |
| 2010/0076331 A1 | 3/2010 | Chan et al. |
| 2010/0152548 A1 | 6/2010 | Koski et al. |
| 2010/0194572 A1 | 8/2010 | Chan et al. |
| 2011/0093296 A1 | 4/2011 | Klink |
| 2011/0230733 A1 | 9/2011 | Al-Ali et al. |
| 2011/0263950 A1 | 10/2011 | Larson et al. |
| 2012/0274464 A1 | 11/2012 | Sweeney et al. |
| 2013/0127980 A1 | 5/2013 | Haddick et al. |
| 2013/0169431 A1 | 7/2013 | Alhuwaishel et al. |
| 2013/0310658 A1 | 11/2013 | Ricks et al. |
| 2013/0318027 A1 | 11/2013 | Almogy et al. |
| 2013/0345530 A1 | 12/2013 | McRoberts et al. |
| 2014/0052464 A1 | 2/2014 | Ray et al. |
| 2014/0163400 A1 | 6/2014 | Khanuja et al. |
| 2014/0247361 A1 | 9/2014 | Sarwar et al. |
| 2014/0275928 A1 | 9/2014 | Acquista et al. |
| 2014/0276552 A1 | 9/2014 | Nguyen, Jr. et al. |
| 2014/0375246 A1 | 12/2014 | Boysen, III et al. |
| 2014/0378786 A1* | 12/2014 | Hong et al. ............. 600/301 |

OTHER PUBLICATIONS

U.S. Appl. No. 14/218,888, Notice of Allowance, mailed Sep. 19, 2014, 18 pages.

U.S. Appl. No. 14/565,373, filed Dec. 9, 2014, Titled: Techniques for Power Source Management Using a Wrist-Worn Device.

U.S. Appl. No. 14/565,384, filed Dec. 9, 2014, Titled: Techniques for Near Real Time Wellness Monitoring Using a Wrist-Worn Device.

U.S. Appl. No. 14/661,834, filed Mar. 18, 2015, Titled: Techniques for Emergency Detection and Emergency Alert Messaging.

U.S. Appl. No. 14/703,291, filed May 4, 2015, Titled: Managing Multi-User Access to Controlled Locations in a Facility.

Blipcare , "Wi-Fi Blood Pressure", retrieved with the Wayback Machine with http://www.blipcare.com/blip-bp.html, Feb. 4, 2013, 4 pages.

U.S. Appl. No. 14/661,834 , "First Action Interview Pilot Program Pre-Interview Communication", mailed Aug. 12, 2015, 4 pages.

PCT/US2015/021335 , "International Search Report and written opinion", mailed Jun. 29, 2015, 21 pages.

U.S. Appl. No. 14/661,834 , "Notice of Allowance", Nov. 12, 2015, 9 pages.

\* cited by examiner

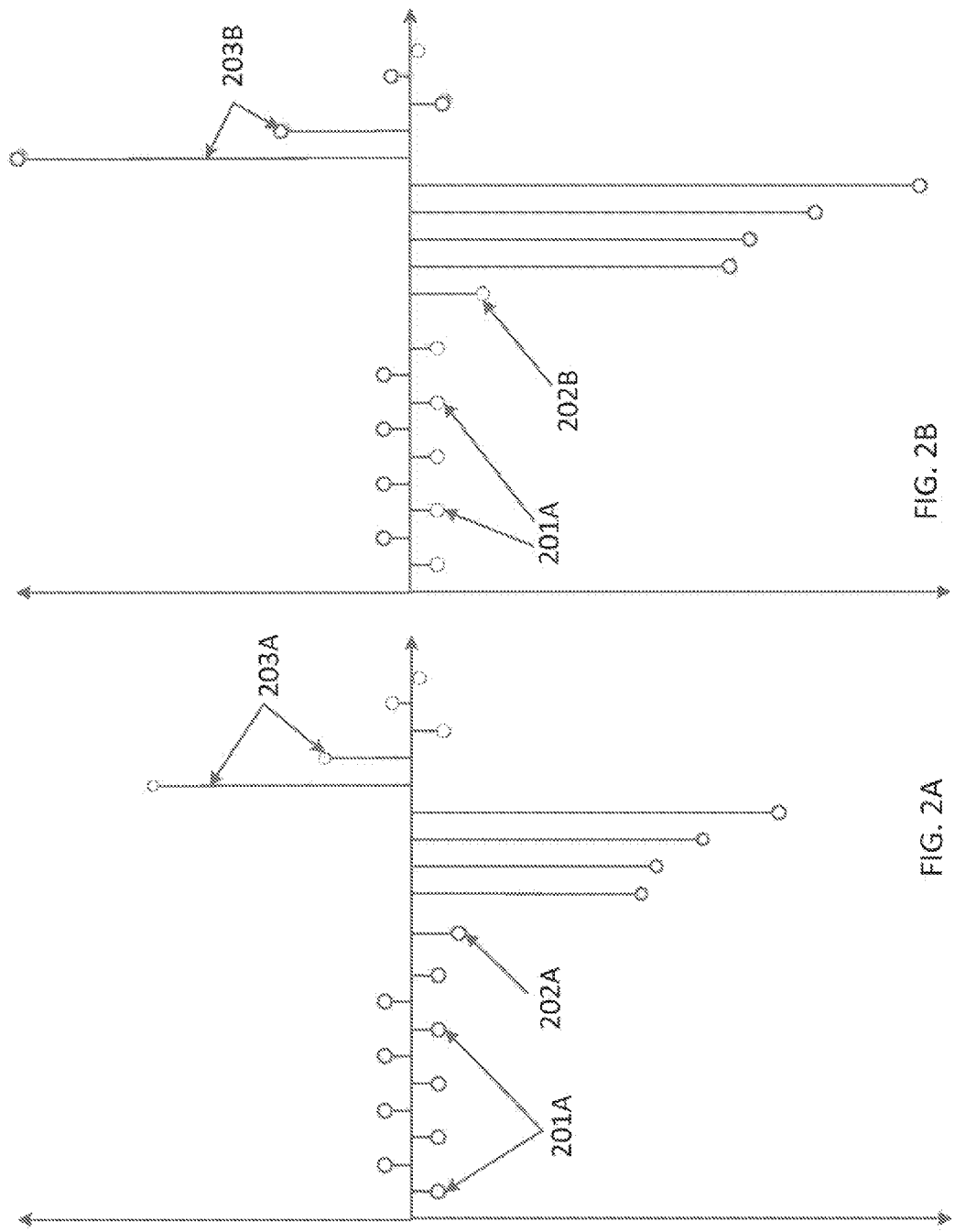

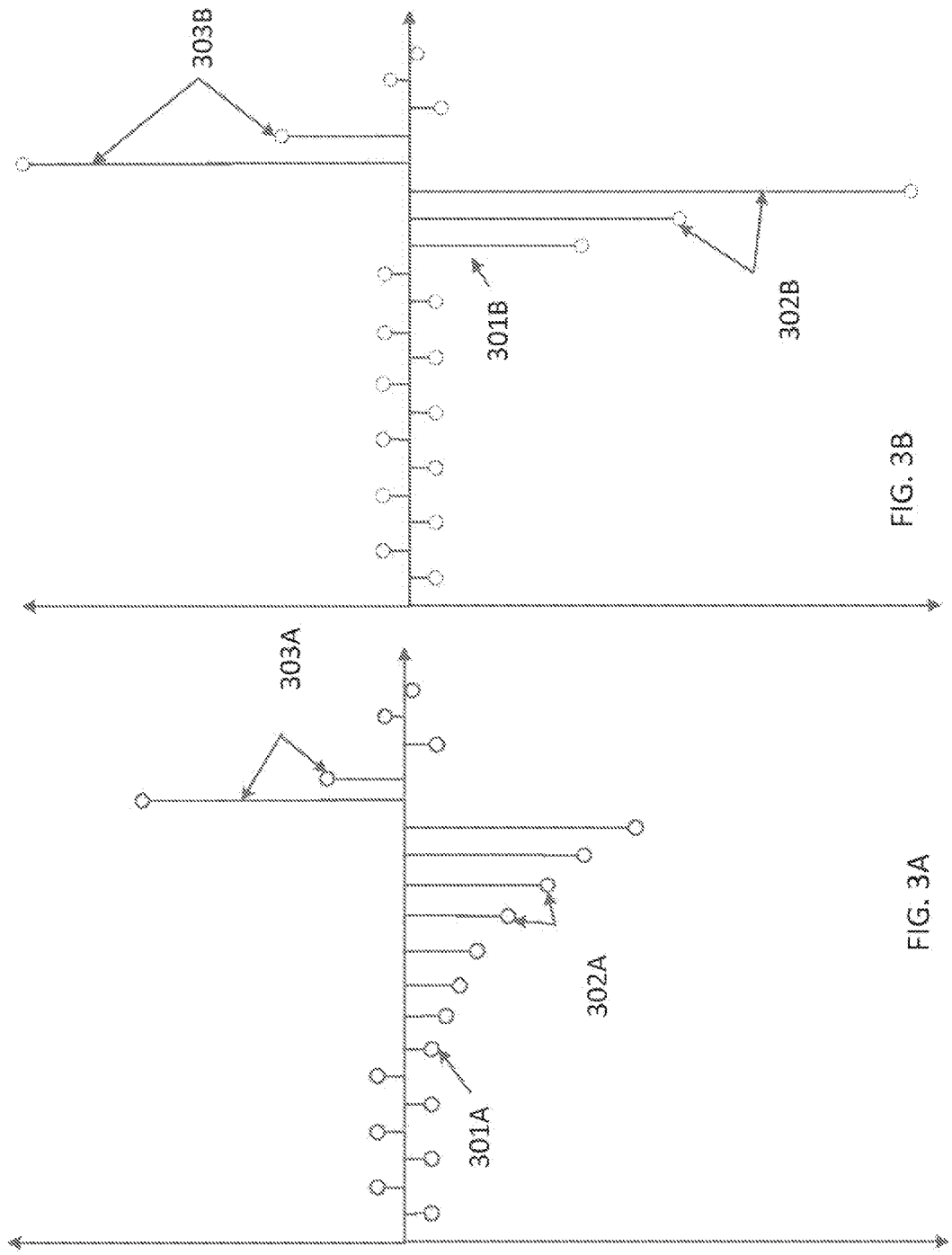

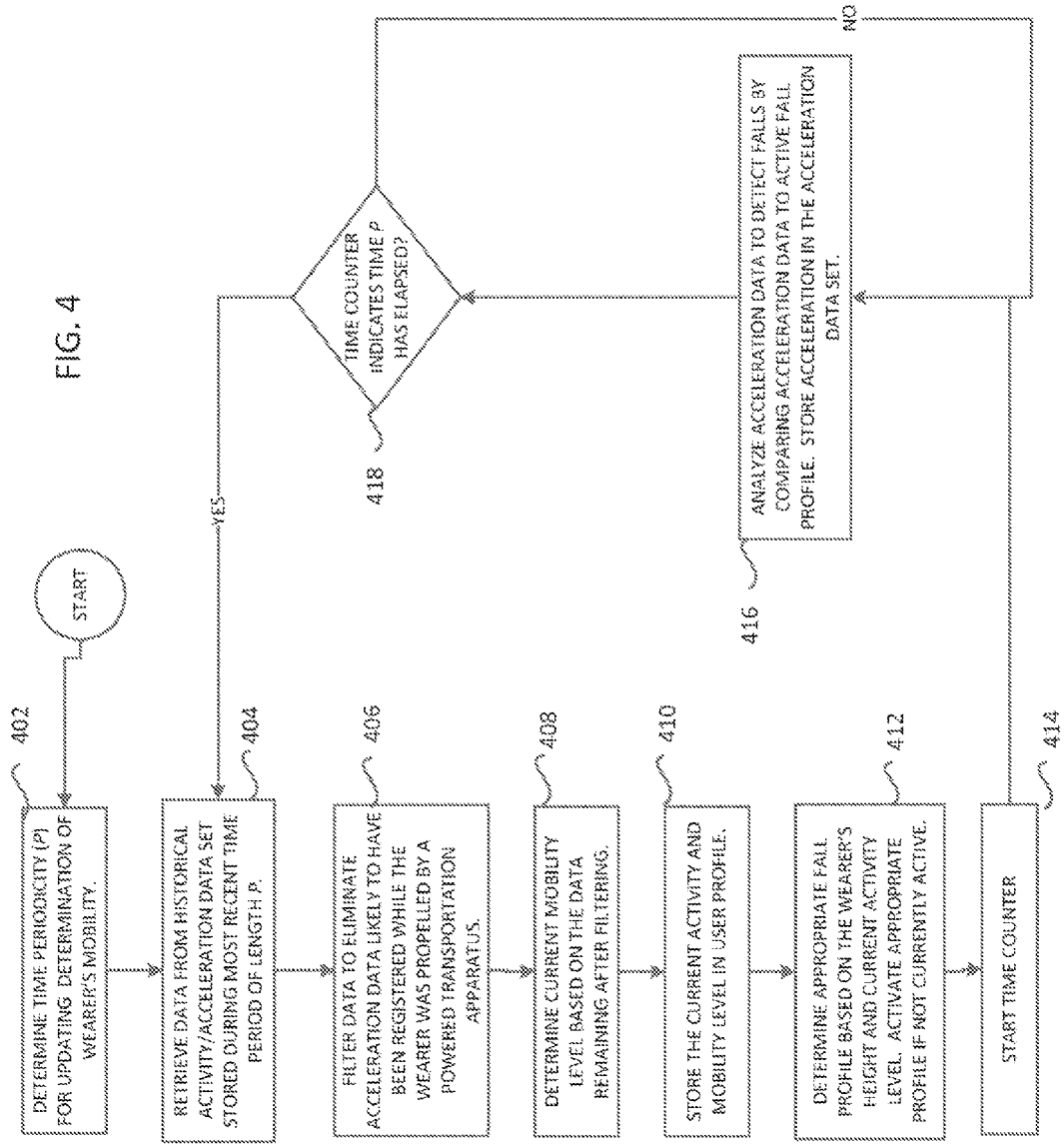

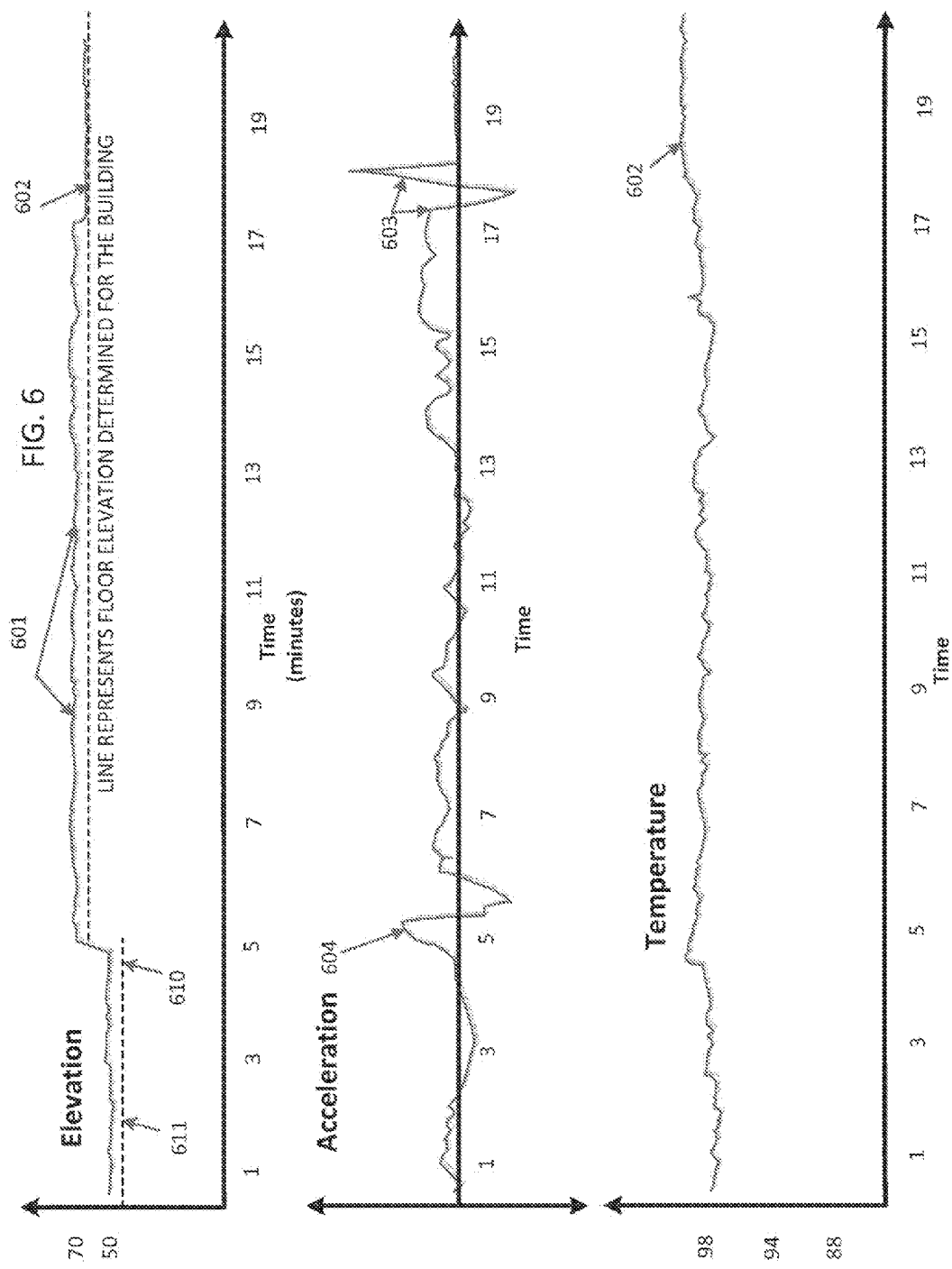

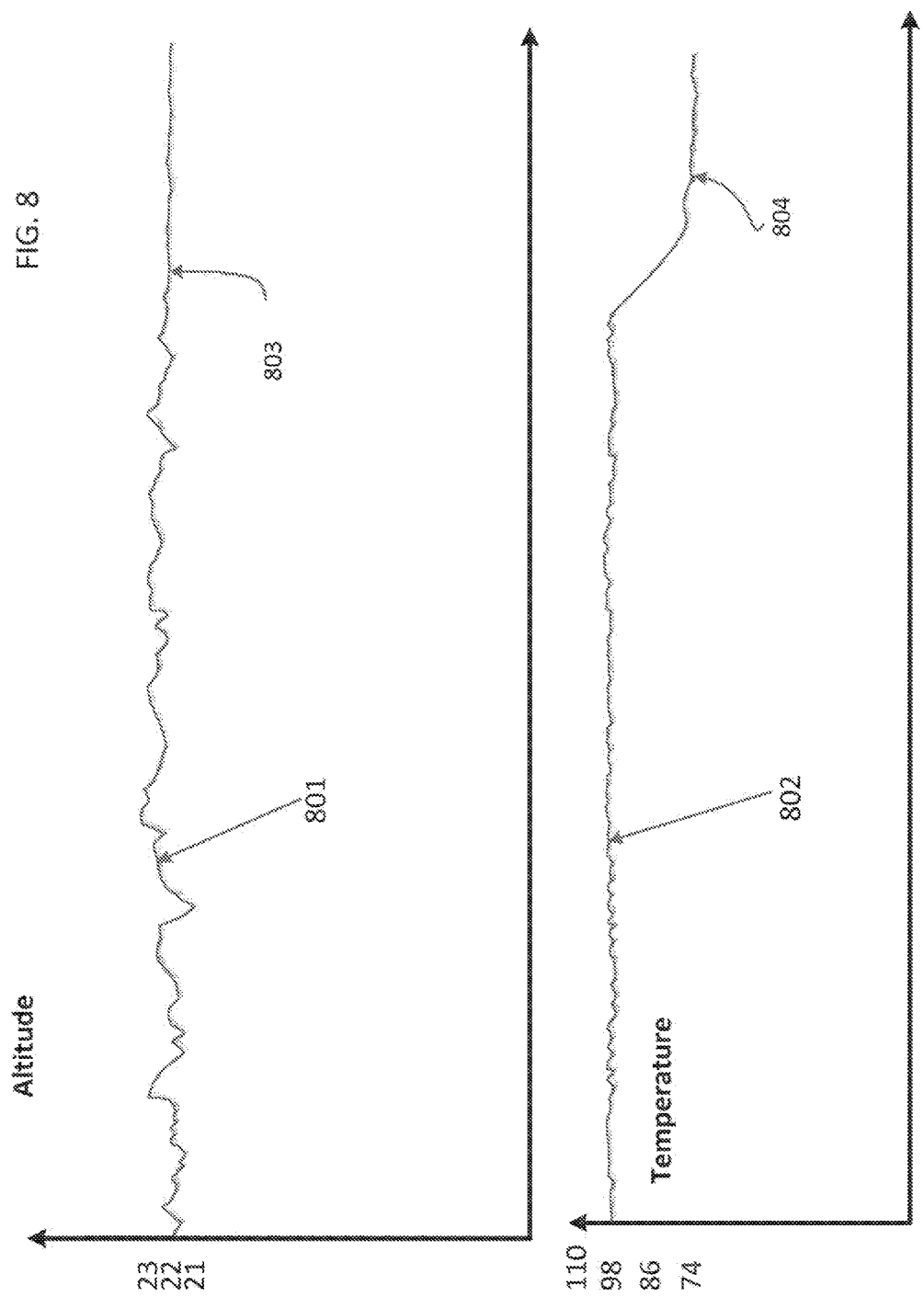

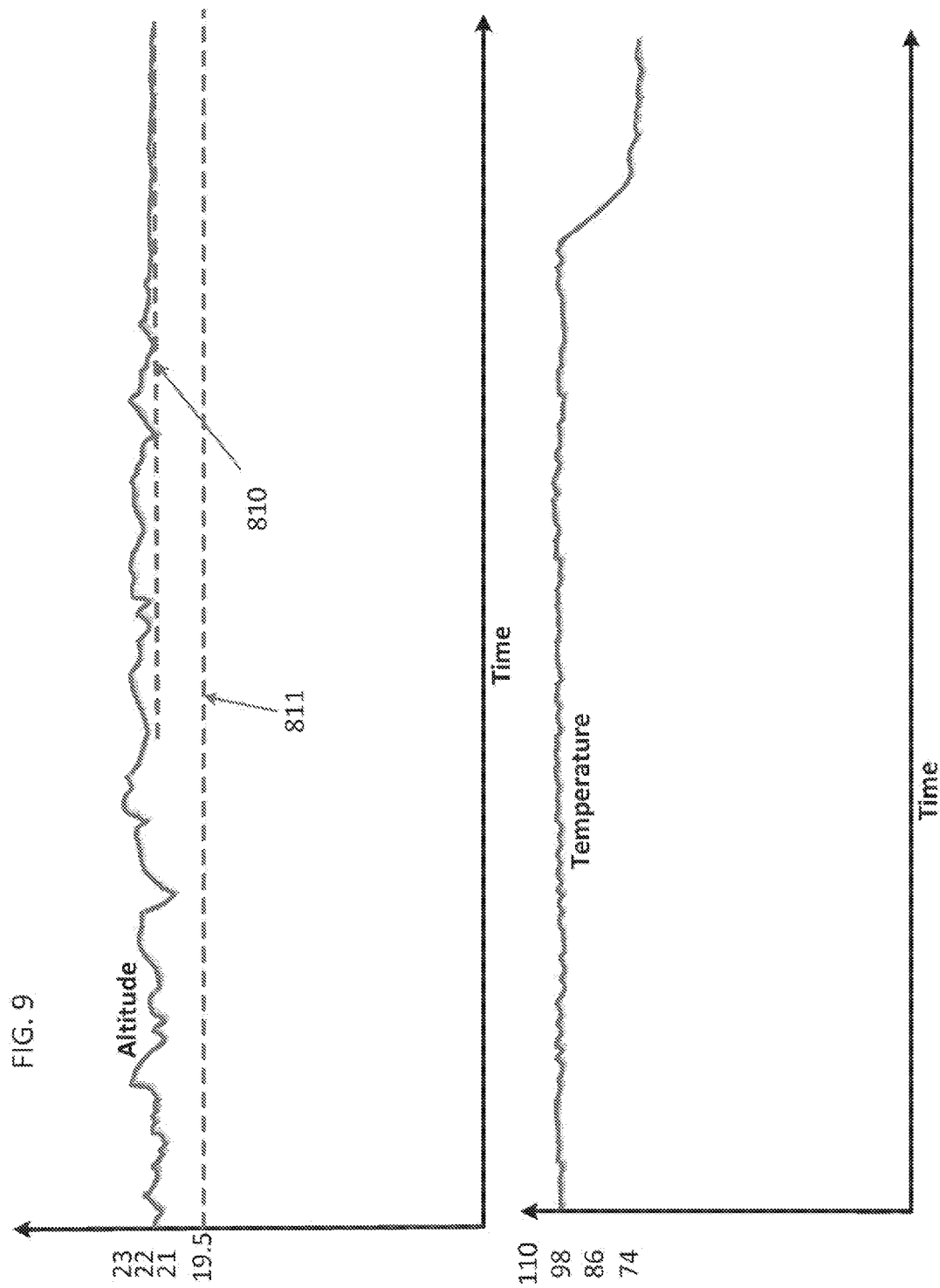

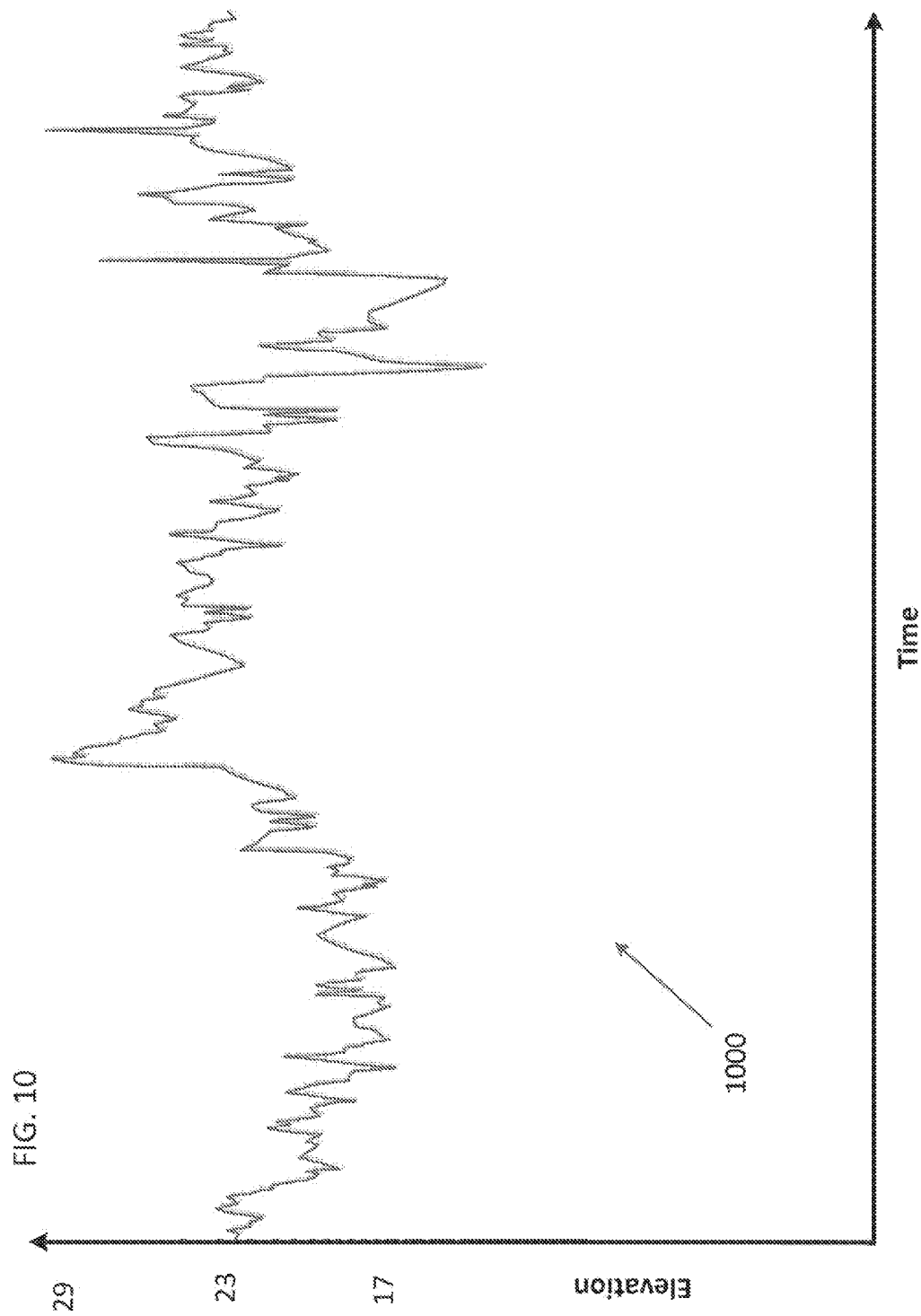

EMERGENCY DETECTION AND ALERT APPARATUS WITH FLOOR ELEVATION LEARNING CAPABILITIES

CROSS REFERENCE TO RELATED APPLICATIONS

The present application is a continuation of U.S. patent application Ser. No. 14/218,888, filed Mar. 18, 2014, and issued Feb. 10, 2015 as U.S. Pat. No. 8,952,818, which is incorporated herein by this reference in its entirety.

BACKGROUND

Aspects of the disclosure relate to a fall detection and unconsciousness detection device with wireless alert capabilities and position reporting.

Certain individuals may be vulnerable to unexpected falls, fainting or collapse. These individuals include the elderly, medicating patients and other individuals who suffer from heart conditions, epilepsy or other such medical problems.

Devices for detecting falls have been used for some time. Most of these devices are worn by an individual at risk of falling. However, detecting falls can be a complicated problem because data registered during a fall may be affected by noise or may be similar to data generated when the wearer performs certain commonplace actions. Also, because people vary greatly with regards to height, weight and activity level, the data generated when one individual suffers a fall may be significantly different than the data generated by when other people suffer falls. For these reasons, conventional fall detectors are highly susceptible to failures when a fall occurs, as well as false-positive fall detections.

BRIEF SUMMARY

This disclosure describes a wearable fall detection apparatus configured to facilitate monitoring a wearer of the apparatus. The apparatus comprises a first sensor configured to generate elevation data that represents an elevation of the apparatus, a second sensor configured to generate acceleration data that represents a magnitude of acceleration of the apparatus, a processor configured to, determine, based on the elevation data, an elevation of a floor located underneath the wearer, and detect a fall affecting the wearer, wherein detecting a fall includes, determining that the acceleration data satisfies a fall hypothesis condition, determining, based on the elevation data, that the apparatus is vertically displaced from the floor by less than a threshold distance, and a transmitter configured to transmit an alert in response to a fall detected by the processor.

This disclosure also describes a wearable fall detection apparatus configured to facilitate monitoring a person wearing the apparatus. The apparatus comprises a first sensor component configured to generate a first signal used to determine an elevation of the apparatus, and a second sensor configured to generate a second signal, wherein the second signal is used to determine location. The apparatus also includes a processor configured to estimate an elevation of a surface located underneath the person, wherein estimating is based on the first signal and the second signal, and detect a fall affecting the person, wherein detecting a fall includes determining, based on the elevation data, that the apparatus is within a threshold distance of one of the surfaces. A transmitter within the apparatus is configured to transmit an alert in response to a fall detected by the processor.

This disclosure also describes systems, methods and computer-program products in which the inventive elements, techniques and process herein disclosed may be embodied. The system, method and computer-program product may be for monitoring a person wearing a device, the device having multiple sensors disposed therein. The system and computer-program product may be configured to perform certain of the following processes which also may characterize the aforementioned method. The processes involve generating elevation data that represents an elevation of the device, generating acceleration data that represents a magnitude of acceleration of the device, determining, based on the elevation data, an elevation of a floor located underneath the person and detecting a fall affecting the person, wherein detecting the fall includes determining that the acceleration data satisfies a fall condition, determining, based on the elevation data, that the apparatus is vertically displaced from the floor by less than a threshold distance, and transmitting an alert in response to a fall detected by the processor.

BRIEF DESCRIPTION OF THE DRAWINGS

Aspects of the disclosure are illustrated by way of example. In the accompanying figures, like reference numbers indicate similar elements.

FIGS. 2A and 2B illustrate example fall profiles with respect to a shorter wearer and a taller wearer, respectively.

FIGS. 3A and 3B illustrate example fall profiles with respect to a relatively inactive and immobile wearer and a relatively more active and mobile wearer.

FIG. 4 is a flow chart illustrating example operations for determining a wearer's mobility and activity level.

FIG. 6 display characteristics of acceleration, elevation and temperature data patterns that the monitoring device may recognize in order to detect falls.

FIG. 8 presents examples of patterns in elevation data and temperature data which the monitoring device may recognize in order to determine elevations of surfaces and floors beneath a wearer.

FIG. 9 illustrates how the monitoring device may determine surface and floor elevations based on patterns in temperature and elevation data.

FIG. 10 illustrates characteristics of noisy elevation data that the monitoring device may recognize in order to determine that elevation data is temporarily unreliable for determining surface and floor elevations.

DETAILED DESCRIPTION

Figure 1A:
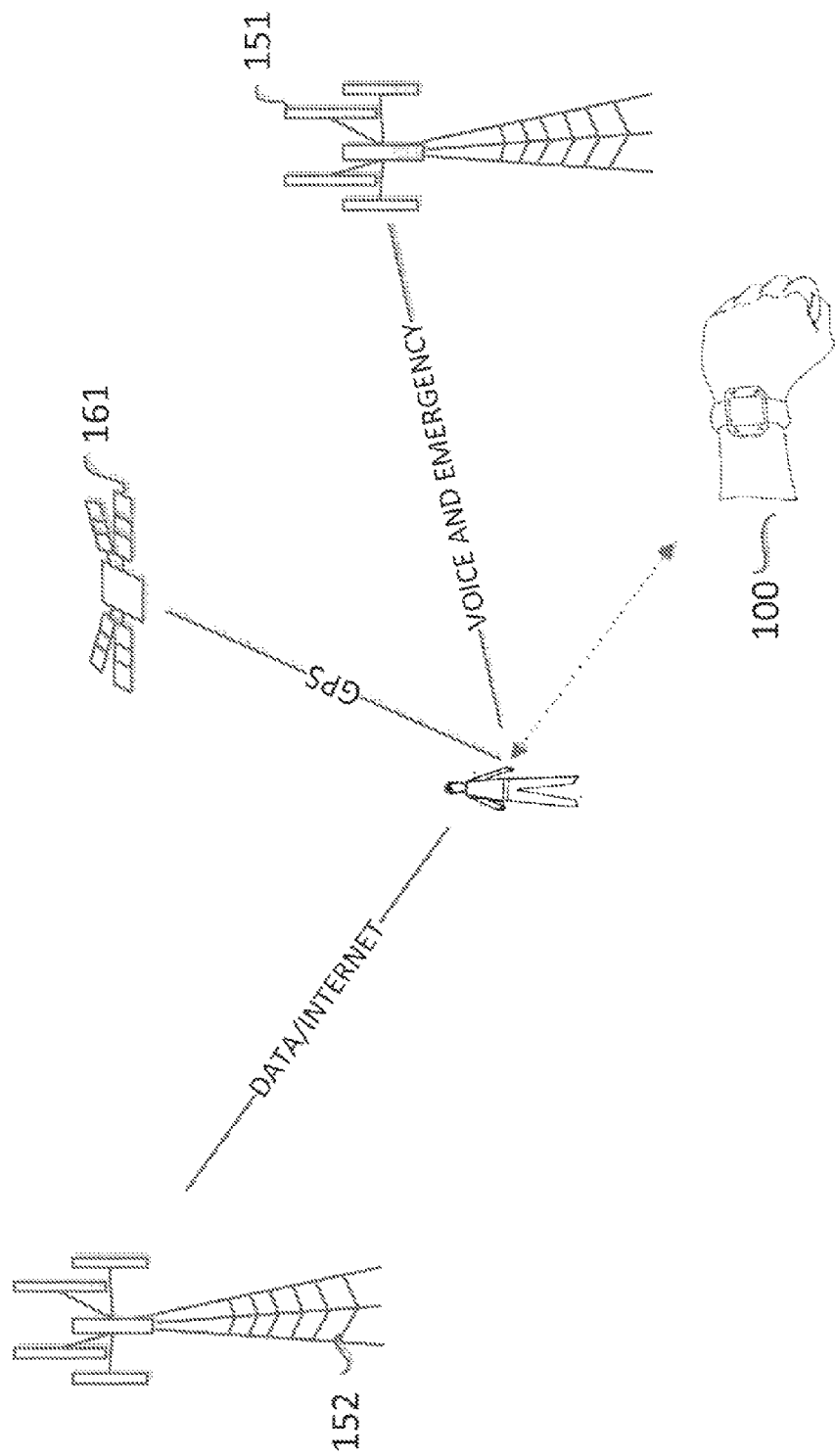
FIG. 1A illustrates a simplified diagram of an example operating environment in which the fall detection device of this disclosure may be commonly used.

This disclosure describes a fall detection and monitoring device ("monitoring device") configured to be worn on the human body. The device includes sensory, communications, processing and software components that provide functionality for executing any number of the techniques, processes or methods (hereinafter the term "disclosed procedures" will refer to the techniques, processes and methods) which are described in this disclosure. The disclosed features enable the monitoring device to detect falls and inform emergency medical personnel when a fall is detected, without incurring a high incidence of false positive detection.

The monitoring device may be configured as a wrist or other similar accessory suitable for attachment on the user's arm or at any other location on the body. The monitoring device includes sensors and wireless communication interfaces that gather or receive data used by the monitoring device to monitor the wearer's condition and learning about the environment in which the monitoring device is being operated. The monitoring device monitors the wearer's condition by determining whether the wearer has fallen, or possibly fallen. The monitoring is performed internally by a processor within the monitoring device which analyzes data from the sensors, stores historical data statistics and summary information, and learns about the wearer and monitoring device operating environment based on the data and inputs provided by the wearer. Certain learning, data storage, and analytical procedures may additionally or alternatively be performed at a server with which the monitoring device is configured to communicate.

The sensors include an altimeter, a thermometer, and an accelerometer. The monitoring device also includes a GPS or other feature for precisely determining location, as well as a clock. In subsequent paragraphs, the term sensor will be used to refer to any of these instruments, to include the GPS and the clock. Hereinafter, the "wearer's condition" or condition relates to the wearer's medical state and whether the wearer has fallen.

The altimeter, accelerometer, and GPS periodically provide data representing the elevation, acceleration, and geographic location of the monitoring device. So that the monitoring device may detect when it is being worn, the thermometer measures the temperature at the monitoring device surface that contacts the wearer's body when the monitoring device is being worn. A digital clock is used to generate a time stamp for each of the data observations generated by the sensors. The time stamps are used by the processor in the analysis of sensor data, and facilitate pattern recognition and improved capacity for determining the operational environment of the monitoring device.

The monitoring device includes intelligent learning capability that involves analyzing GPS data and timestamps to learn the location of buildings in which the user spends significant amounts of time. When a building is recognized in this way, the monitoring device further stores and analyzes altimeter and temperature data registered for so long as the device continues to sense that it is within the building. In this analysis, the monitoring device learns the elevations of significant surfaces such as floors, tables, and desks. The monitoring device stores the elevation information for use in detecting falls when the wearer and device are within the building.

By learning elevations of surfaces in a building, the monitoring device is able to later compare recent elevation data to the learned elevations when acceleration indicative of a fall is detected within the building. Any such comparison may serve to confirm a fall when the elevation indicated by the recent data is approximately commensurate with the elevation of a floor in the building. Conversely, the monitoring device determines that a fall has not occurred when the elevation indicated by the recent data is not commensurate with any learned floor elevation in the building.

The monitoring device includes a touchscreen, button or keypad interface, or other similar interface. The interface facilitates soliciting information from the wearer, and obtaining input data and information provided by the wearer in response.

The monitoring device solicits information about the wearer or the wearer's condition or environment so as to improve its fall detection analysis and avoid false positive detections. For example, the monitoring device uses wearer inputs to obtain information about the wearer's physique, lifestyle, health, activity level and other information relevant to fall detection. The monitoring device further solicits any wearer inputs that may facilitate improved learning, analysis and sensing performed by the monitoring device. For example, when the monitoring device detects that position and elevation information is approximately unchanged throughout an evening, the monitoring device may solicit the wearer to confirm that he is at home, or on a specific floor of his house. The monitoring device may store inputted confirmations or information in memory, as well as modify its analysis of sensor data based on the information provided by the inputs.

The monitoring device is configured with an antenna, receiver and transmitter, and is designed to communicate wirelessly on conventional cellular or data networks. When the monitoring device detects that the wearer has fallen, it communicates an alert to medical facilities or an emergency dispatcher. The alert may include information about the wearer's location and elevation, as well as any other information relevant to assisting medical crews in locating and attending to the wearer. For example, health information that the wearer has previously inputted to the monitoring device may be included in an alert message transmitted in response to detection of a fall.

The touchscreen or interface is used to communicate with the wearer when a fall is detected. By communicating with the wearer, the monitoring device obtains information that confirms the occurrence of a fall or indicates that a false positive detection has occurred. By facilitating user communications to override the detection of falls, unnecessary alerts to medical dispatching or emergency services is avoided.

Several technical features of the monitoring device will now be described with respect to the accompanying drawings. FIG. 1A is a simplified illustration of an example operating environment in which the monitoring device is used. As depicted in FIG. 1A, the monitoring device 100 is fastened to a wearer located in an outdoor area. The outdoor area is depicted as being within the coverage area of a cellular network, and the monitoring device 100 exchanges cellular network control, timing and status information with a cellular network access point (AP) 151 so as to maintain emergency communication capabilities in the cellular network.

AP 152 may provide access to the internet or other data network. The monitoring device 100 establishes an internet connection by detecting AP 152, performing joining procedures, and regularly exchanging status, control and routing information with the AP 152. The monitoring device 100 regularly uses the internet connection to access weather data measured near the location of the monitoring device. Specifically, the monitoring device 100 accesses most recently available barometric pressure information, which it uses to adjust the elevation measurements provided by its altimeter, so as to correct for changes in atmospheric pressure.

As is further depicted in FIG. 1A, the monitoring device receives GPS information transmitted by GPS satellites 161 and land-based communication platforms in one embodiment. A GPS component of the monitoring device 100 uses this information to periodically determine a latitude and longitude that represent the monitoring device position. The monitoring device 100 uses this location information for any of several different purposes. For example, when the monitoring device 100 accesses a data network to obtain current weather information, the monitoring device 100 uses the location information to identify a nearest weather station or observation locale from which to retrieve current barometric pressure data.

The monitoring device 100 uses location information as an additional means of confirmatory data for avoiding false positive fall detections when data from other sensors is consistent with a fall having occurred. For example, when changes in acceleration or altitude data is indicative of a fall, location information may be used to determine that the wearer is actually mobile, and that the change in the altitude or acceleration data is actually a false indication. Such a scenario may occur, for example, when the user is in an accelerating vehicle travelling down a hill. In such a hypothetical case, downwards acceleration of the vehicle might be similar to the typical acceleration data registered when a fall occurs. However, the movement of the vehicle, as registered by changing GPS data, would reveal that the wearer is in motion and therefore has not fallen on the ground.

The monitoring device 100 also uses location information to learn the latitude and longitude of buildings in which the wearer spends significant time, and sense that it is present within a building. The monitoring device 100 uses a building sensory capability within the broader learning process used to determine the elevations of floors and surfaces within a building.

Figure 1B:
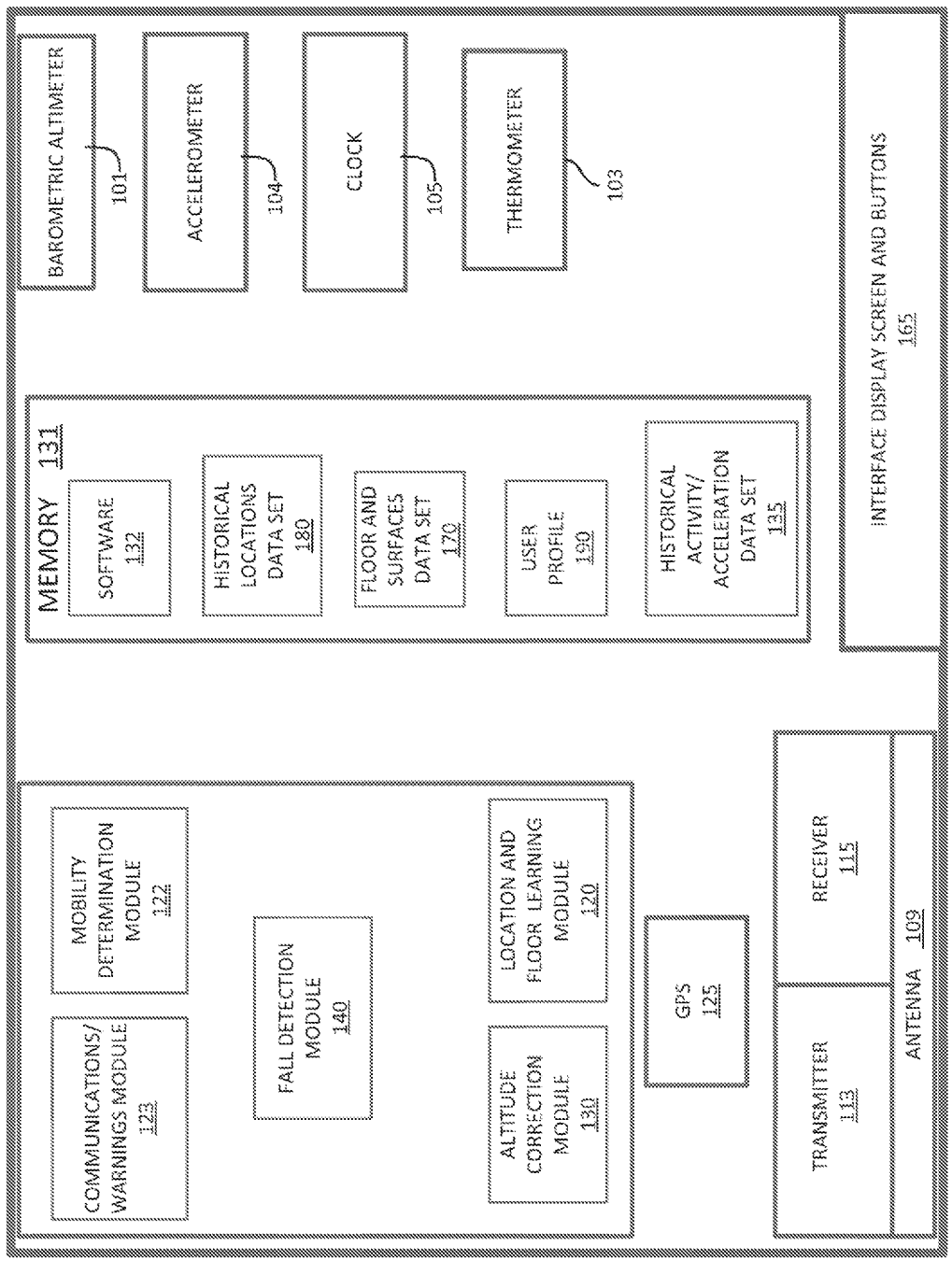
FIG. 1B illustrates example components of the fall detection device of the present disclosure.

FIG. 1B provides a simplified and generalized diagram of example components and modules of the monitoring device 100, including certain simplified components for detecting falls using the techniques and processes described herein. FIG. 1B illustrates that the monitoring device 100, as mentioned previously, includes a barometric altimeter 101, GPS 125, thermometer 103, accelerometer 104, clock 105 and interface and display screen 165.

The barometric altimeter 101 includes a transducer configured to generate an analog voltage signal that varies in proportion to changes in atmospheric pressure impinging on the transducer. A control component within the altimeter 101 is used to receive a control signal from the altitude correction module 130 of processor 121. The control signal is used to bias or trim the voltage signal in a manner that compensates for the changes in sensed pressure caused by climatic changes. The altitude correction module 130 generates the control signal based on the most recent weather information received by the monitoring device 100. An analog to digital converter (not shown) at the altimeter output is used to provide periodic digital elevation data.

The fall detection module 140 analyzes acceleration, elevation, temperature and GPS data to detect and confirm falls. The fall detection module 140 uses elevation data as primary data for detecting a fall. That is, the fall detection module 140 analyzes elevation observations as they are obtained, and in conjunction with preceding observations, to determine if the observations are consistent with a fall. This use is in contrast to use of elevation data as confirmatory data. When a type of data is confirmatory data, observations are only analyzed for fall detection purposes when they coincide with a determination, based on other data, that a fall may have taken place.

Depending on the performance characteristics of the accelerometer 104 and the altimeter 101, acceleration data may be more suitable than elevation data for use as primary data in detecting falls. In this case, use elevation data as confirmatory data may facilitate computational efficiency and enable lower power consumption within the monitoring device 100.

The thermometer 103 provides digital temperature data that is also used as a source of confirmatory information when acceleration data and elevation data is consistent with a fall. The temperature data provides a means for determining that the wearer has removed the monitoring device 100. This capability is important for preventing false-positive fall detections because removing the monitoring device 100 and placing it on a small table or nightstand may result in acceleration and altimeter data that is similar to the data produced during a fall.

In general, when the monitoring device 100 is removed from the wearer's body, the temperature data declines quickly and steadily towards room temperature. Moreover, when a wearer falls, the temperature data normally increases slightly. By detecting a steadily falling temperature, the monitoring device 100 avoids false-positive fall detections caused by the monitoring device 100 being removed from the body.

The monitoring device 100 is equipped with data processing capabilities and learning features that enable it to sense when it is within a building (or other area that the wearer frequents and which is flat, such as a backyard), identify the building and learn the elevations of floors and other surfaces therein. The processing associated with these detection and learning features is controlled by the location and floor learning module 120 of processor 121. The processing involved in sensing that the monitoring device 100 is within a building includes analysis of GPS data and time data using procedures that will be described more thoroughly in subsequent paragraphs. Analysis of elevation data is also be used as part of this sensing process.

When the monitoring device 100 detects that it has been brought into a building that has not previously been detected, the location and floor learning module 120 causes the building location to be stored in the historical locations data set 180. Additionally, when presence within a building is sensed (whether a previously detected or unknown building), the locations and floor learning module 120 causes the monitoring device 100 to enter a data gathering and analysis mode that will be referred to hereinafter as the elevation learning mode. While the elevation learning mode is active, the locations and floor learning module 120 causes GPS, elevation, time and temperature information to be temporarily stored as time series data. This information is stored in the floor and surfaces data set 170, and is indexed to the building location. The locations and floor learning module 120 periodically analyzes the data to learn the elevations of surfaces and floors in the building.

When a floor or surface elevation is learned, the locations and floor learning module 120 stores the information about the elevation in the floor and surfaces data set 170. For example, the stored information indicates the elevation determination, the building in which the elevation was learned, and whether the elevation corresponds to a surface or a floor. Elevation information stored in this way is incrementally refined through later analysis, and is used by the fall detection module 140 when confirmation or rejection of a fall hypothesis is needed.

Furthermore, while the monitoring device 100 is in the elevation learning mode, the locations and floor learning module 120 continues to analyze GPS data for the purposes of detecting removal of the monitoring device 100 from the building. When the monitoring device 100 is determined to have been removed from the building, the elevation learning mode may be suspended and the locations and floor learning module 120 then analyzes GPS data to detect entry into other buildings.

The location and floor learning module 120 manages the processing associated with detecting presence within buildings, storing building locations and learning elevations of surfaces and floors in the building. The location and floor learning module 120 may be designed so as to catalog and learn elevations with respect to buildings in which the wearer spends a significant portion of time.

The location and floor learning module 120 uses several different techniques to learn building locations and detect when a user is in a known building. One method for learning building locations involves detecting loss of GPS 125 service followed, after a substantial delay, by reestablishment of service close to where the service interruption occurred.

Commonly, the quality of signals transmitted by satellites is impeded by the walls and enclosures of buildings. Thus, GPS 125 position information is oftentimes unavailable when a GPS 125 device is brought within a building, and lost GPS 125 information is frequently caused by entering a building. Similarly, reestablishment of GPS service frequently occurs when a wearer exits a building in which GPS 125 service was unavailable. For this reason, the location and floor learning module 120 determines where and when GPS 125 service is lost and regained in order to detect and determine the location of a building that the monitoring device has not previously detected.

However, certain buildings and homes do not interfere with the reception of GPS data. For this reason, the location and floor learning module 120 uses an additional method for building identification that is based on detection of long periods of unchanged GPS 125 location data. As part of this methodology, a threshold number of such detections at any one location or a minimum frequency of detections during a prescribed time period is used as a condition for determining that a building exists at that location. Such conditions are used to prevent the monitoring device 100 from performing operations to learn elevations of floors and surfaces in buildings which the wearer does not routinely visit.

While performing analysis of GPS data to detect new buildings, the location and floor learning module 120 may also compare each incremental GPS location to determine if the most recent GPS location coincides with the location of a building entry in the buildings data set. When a GPS locations coincide with the location of a building entry, the location and floor learning module 120 activates the elevation learning mode.

The location and floor learning module 120 further incorporates a feature for determining that all of the buildings most frequently visited by the wearer have been detected. When this determination feature is used, the processing associated with learning new building locations is terminated or temporarily halted upon the determination being made. In this way, the monitoring device 100 conserves processing resources which otherwise might be devoted to learning the locations of buildings which the wearer rarely visits and are therefore unlikely to be the location of a fall.

The monitoring device 100 also includes a transmitter 113, receiver 115 and antenna 109. The transmitter 113 and antenna 109 facilitate emergency communication of fall alert messages and other relevant monitoring or wearer information. The emergency communications are transmitted on any wireless network such as a cellular network, data network or satellite network. The receiver 115 and antenna 109 facilitate receiving communications associated with alert messages, as well as software updates and other information used at the monitoring device 100. The receiver 115 is also used to receive weather information from a data network, and provide the weather information to the altitude correction module 130.

The processor 121 executes software 132 or other instructions stored in memory 131. The software 132 controls the gathering, recording, analysis, organization and storage of sensor data and user inputted data. When the processor 121 executes the software 132, the software 132 causes several processing modules to become active within the processor 121. The processor modules include a mobility determination module 122, a communications/warnings module 123, the fall detection module 140, a the location and floor learning module 120, and the altitude correction module 130.

The altitude correction module 130 performs operations and schedules data network communications to periodically obtain weather data for the area in which the monitoring device 100 is being operated. The altitude correction module 130 uses this data to determine an altitude correction factor to account for atmospheric pressure variations affecting the pressure sensed by the altimeter 101. The altitude correction module 130 then generates a control signal that is proportional to the altitude correction factor. The altitude correction module 130 provides the control signal to a control component (not shown) within the barometric altimeter 101. The control component adjusts the analog to digital conversion process that yields the outputted digital elevation data so that the output will reflect only actual elevation change and will not reflect pressure changes resulting from climatic variation.

The altitude correction module 130 receives and monitors GPS 125 data to detect changes in the location of the wearer. For so long as the wearer's location remains relatively constant, the altitude correction module 130 obtains regularly scheduled weather information updates. The weather information updates are transmitted by a remote server to the monitoring device 100 over the data network. The monitoring device 100 reports its geographic location to the server so that the server may select weather information corresponding to the location of the monitoring device 100. Alternatively, relevant weather information is provided based on the location of a base station, relay station, or other network access point from which the monitoring device 100 receives network data. In either of these cases, the regularly scheduled weather updates may be obtained in much the same way that weather information is received at a mobile device or smartphone that executes application software for displaying recent weather data.

The altitude correction module 130 is also designed with functionality for soliciting a weather update at an unscheduled time. Soliciting a weather update in this manner may be beneficial when the position of the monitoring device 100 has changed substantially in a short amount of time. Soliciting a weather update is performed by using the data network to send a weather update request signal to the remote server.

The accelerometer 104 may be a digital device capable of repeatedly generating digital acceleration data at a fixed measurement time interval. The fall detection module 140 repeatedly analyzes a window containing a fixed number of most recent acceleration observations, and determines whether the analyzed data satisfy a sufficient or threshold number of fall conditions for a fall possibility hypothesis to be generated.

The window may be updated at a fixed interval so as to reflect newly registered data, and the data in the window may be analyzed each time the window is updated. For example, the window may be updated and reanalyzed each time a new altitude data observation is registered, or may be updated and reanalyzed at any other fixed interval of time.

Hereinafter, this window will be referred to as an acceleration analysis window. The fall detection module 140 described and covered by this disclosure is configured to analyze the acceleration analysis window and determine if the data in the analysis window satisfies any number or combination of fall conditions, and this description is not intended to be limited to wearable fall detection devices using certain specific fall conditions or combinations thereof.

A simple example of a fall condition is a threshold acceleration condition that is satisfied when a minimum number of data observations in the analysis window represent downwards or upwards acceleration in excess of a threshold chosen based on the characteristics of falls analyzed in a testing environment. Similarly, an acceleration range condition may be used. An acceleration range condition is a condition defined so as to be satisfied when some specified number of data observations in the analysis window represent downwards or upwards acceleration within a specified acceleration range. The acceleration range may be defined based on the characteristics of falls analyzed in a testing environment.

Another condition that will be explained in subsequent paragraphs is satisfied when the acceleration data in the analysis window is similar to a modeled fall (hereinafter referred to as a "fall profile"), as represented by a series of hypothetical acceleration observations. To determine if this condition is satisfied, the fall detection module 140 performs point by point comparisons of the acceleration data in the analysis window and the hypothetical acceleration observations provided by the model. Each point by point comparison yields a difference, and the fall detection module 140 sums the differences yielded by the comparisons of the various data points in the observation window. The sum is considered to represent what will be referred to hereinafter as a deviation from the fall profile.

If the deviation is less than a threshold amount, the fall detection module 140 determines the condition to be satisfied. The fall profile and the threshold amount is encoded into the software 182. These parameters may be determined in a testing environment by comparing the fall profile to data obtained during actual falls, and determining a distribution of the deviations registered in these studied cases. Based on the distribution of deviations, the threshold is set so as to achieve a desired balance between the detection of actual falls on one hand, and the avoidance of false-positive detections on the other hand.

The fall detection module 140 is designed to use any number of other such conditions relevant to detecting a fall based on acceleration data, regardless of the simplicity or complexity of the conditions. The fall detection module 140 generates a fall possibility hypothesis upon certain combinations of conditions being satisfied, upon a threshold number of conditions being satisfied, or upon any single condition is satisfied. When the fall detection module 140 makes such a hypothesis, it subsequently analyzes elevation, temperature and GPS data for the purpose of confirming that a fall occurred.

In certain implementations of the techniques described herein, the fall detection module 140 may be designed so as to determine that a fall has occurred when analysis of the elevation data confirms the fall possibility hypothesis. Alternatively, in other implementations, the fall detection module 140 is configured to make such a determination only when temperature and/or GPS data do not contradict the fall hypothesis, or confirmation is provided by some combination of the elevation, GPS and temperature data.

As will be described in later paragraphs, the monitoring device 100 fall detection module 140 senses that recent acceleration data is consistent with a fall based on comparing the acceleration data in the acceleration analysis window to a fall profile. The fall profile is an acceleration model representing an expectation of the acceleration data that would be observed upon a fall occurring. For example, a fall profile may be a discrete function showing the magnitude and duration of expected downwards acceleration, and a magnitude and duration of acceleration in the upwards direction. The expected acceleration in the upwards direction is the acceleration expected to result from a wearer breaking the fall with his hands.

A fall profile is represented by a series of hypothetical acceleration data points, such that the number of data points is commensurate with the number of actual acceleration data points considered in each instance of the acceleration analysis window. A fall profile is deduced or established in a development phase, through use of any one of several methodologies. For example, in the development phase, accelerometers may be used to study actual falls suffered by a variety of people for which characteristics such as height, weight, age mobility and activity level are known. This acceleration data may be studied for different groups of similarly characterized users, and an average fall profile may be calculated mathematically for each such user group.

Humans who are highly mobile and active tend to accelerate differently when suffering a fall, as compared to other humans who are less active. People who are mobile and active tend to suffer falls associated with tripping or slipping, while those who are inactive tend to suffer falls associated with collapsing, feinting or losing the necessary strength to sustain themselves. Falls caused by slipping or tripping tend to occur faster, and with greater acceleration than falls caused by collapsing feinting or losing strength.

Similarly, tall people fall differently from shorter individuals. For example, on average, a fall suffered by a tall person will involve greater acceleration than a fall suffered by a short person, and may be punctured by sharper deceleration (upwards acceleration) when the fall is broken. For this reason, the software 132 provides the monitoring device 100 with several different fall profiles, each of which is intended for use in association with a specific combination of wearer mobility and height characteristics.

FIG. 2A and FIG. 2B show two examples of hypothetical fall profiles, 2A, 2B. FIGS. 2A and 2B are intended to comparatively show how the fall detection module 140 uses a fall profile that is customized in view of the wearer's height, as learned from wearer information which the monitoring device 100 may solicit and store in user profile 190, and which may be inputted through the user interface 165. It should be understood that FIGS. 2A and 2B are highly simplified, and are presented so as to explain general concepts only. In actuality, a functional fall profile may need to contain many more acceleration data points, and the relative magnitudes of consecutive data points may be substantially different than the FIGS. 2A and 2B might seem to imply.

FIGS. 2A and 2B are intended to show how a fall detection profile used to monitor the condition of a short wearer is different from a fall detection profile used to monitor the condition of a taller user. For example, as compared to the fall profile in FIG. 2B, the fall profile in 2A is more accurate when applied to monitor the well-being of a short user, and fall profile 2B may be understood as a profile that could hypothetically be more suitable to monitoring a taller user.

As depicted in FIGS. 2A and 2B, each fall profile includes several consecutive acceleration data points shown in time series, such that every two consecutive points are spaced 200 milliseconds apart. The expected acceleration data points of a fall profile are given with respect to a periodic time interval that is equivalent to the measurement interval of the accelerometer in the monitoring device.

Moreover, at 201A and 201B, the fall profile includes acceleration data points that indicate a relatively small amount of vertical acceleration, as ordinarily occurs when a wearer is sitting down, standing still, or walking at a normal speed. A first data point associated with initiation of a fall is shown at 202A and 202B. Both FIGS. 2A and 2B show how acceleration is expected to increase as a fall develops. This expectation is manifested in the several consecutive data points occurring after 202A, 202B, each of which shows steadily increasing acceleration in the downwards direction. However, in FIG. 2B, these several consecutive data points have greater magnitude than the corresponding data points of FIG. 2A. This difference is a result of the fact that taller individuals tend to fall with greater acceleration than shorter individuals.

In FIGS. 2A and 2B, the depicted fall profiles include data points representing an expected upwards acceleration caused by fall breakage associated with hitting the ground backwards or impacting the ground hands first. As compared to a short wearer, a tall wearer will commonly fall with higher vertical acceleration. Thus, the upwards acceleration occurring upon a fall being broken will ordinarily be higher as well. For this reason, fall profile data points 203A show a larger expected magnitude of upwards acceleration than data points 203B.

The mobility determination module 122 includes instructions for enabling the monitoring device 100 to determine information about the wearer's lifestyle so that a fall profile that is customized to the wearer's height can be further customized to the wearer's level of activity (e.g. often the wearer is standing or walking) and mobility (e.g. how fast the wearer moves). The wearer activity and mobility may be determined by soliciting the wearer's personal assessment of these characteristics by way of the interface 165 functionality, as controlled by the communications/warnings module 123. When activity and mobility information is obtained or updated, it may be stored in the user profile 190 and used at any time as a reference for customizing a fall profile for the wearer.

In addition to soliciting activity and mobility information from a wearer, the mobility determination module 122 may determine the wearer's activity and mobility by analyzing recent GPS data, acceleration data and elevation data. As this data is generated, it may be stored in the activity/acceleration dataset 135 for future analysis by the mobility determination module 122. The data may be stored in a manner that is suitable in view of the processing configuration and depth of the analysis used by the mobility determination module 122. However, the data analyzed by the mobility determination module 122 should be filtered so that the module does not consider rapidly changing data of the sort that could result only from the user being propelled by a car, airplane, or other means beyond the wearer's own physical efforts.

Once rapidly changing data is eliminated by filtering, the remaining GPS, acceleration and altimeter data may be stored chronologically in respective data structures within the historical activity/acceleration data set 135. Moreover, each data observation may be indexed to a time stamp indicating the time at which the observation was registered. The mobility determination module 122 may periodically calculate metrics representative of the mobility of the wearer by processing recently stored data in the historical activity/acceleration dataset 135. For example, the mobility determination module 122 may analyze this data on a daily or weekly basis and calculate an average amount of time that the wearer spent moving, and the wearer's average speed when moving. The mobility determination module 122 may use these calculations to categorize the user as either mobile or immobile, and active or inactive, or may make more granular characterizations in this regards.

The fall detection module 140 periodically references the most recent activity and mobility characterizations made by the mobility determination module 122. The fall detection module 140 uses the characterizations as a basis for selecting from memory and activating a fall profile that is appropriate in view of the wearer's physique, mobility and activity. The selected fall profile is then used by the fall detection module 140.

FIG. 3A and FIG. 3B show two examples of hypothetical fall profiles, 3A, 3B. FIGS. 3A and 3B are intended to show, by way of a comparison, how the fall detection module 140 may use a fall profile that is customized in view of the wearer's activity and mobility. For example, FIGS. 3A and 3B are intended to show how a fall profile used in monitoring the condition of an inactive and immobile wearer may be different from a fall profile used in monitoring the condition of a wearer who is mobile and active. For example, as compared to the fall profile in FIG. 3A, the fall profile in 3B may be more accurate when applied to monitor the well-being of a more active and mobile user, and fall profile 3A may be understood as a profile that could hypothetically be more suitable to monitoring a user who is less active and mobile.

As depicted in FIGS. 3A and 3B, each fall profile includes several consecutive acceleration data points, such that every two consecutive points are spaced 200 milliseconds apart. The expected acceleration data points of a fall profile are given with respect to a periodic time interval that is equivalent to the measurement interval of the accelerometer 116 component.

A first data point associated with initiation of a fall is shown at 301A and 301B. Both FIGS. 3A and 3B show how acceleration is expected to increase as a fall develops. This expectation is manifested in consecutive data points 302A, 302B, each of which shows steadily increasing acceleration in the downwards direction. However, in FIG. 3B, the acceleration increases more rapidly, and the data points show greater magnitude than the corresponding data points of FIG. 3A. Also, the profile of the fall modeled in FIG. 3B occurs in a smaller amount of time than the profile of the fall modeled in FIG. 3A.

FIG. 4 is an embodiment of a flowchart that provides example operations performed by the mobility determination module 122 to determine and update a wearer's level of activity and mobility so that a suitable fall profile is used for fall detection purposes. The operations begin at 402, and involve the mobility determination module 122 first retrieving a time periodicity parameter that dictates the period of the cycle to be used for updating the wearer's activity and mobility. At 404, the mobility determination module 122 retrieves data from the historical activity/acceleration data set 135. The retrieved data is recent acceleration, GPS or elevation observations stored since the last occasion on which the wearer's mobility and activity level was determined.

At 406, the mobility determination module 122 filters the retrieved data to eliminate elevation, GPS or acceleration data likely to have been registered while the wearer was propelled by a power transportation apparatus. As mentioned previously, this filtering is performed so that only data representing the wearer's own physical efforts will be evaluated in determining the activity and mobility. At 408 the mobility determination module 122 estimates the wearer's current mobility and activity level based on the data remaining after the filtering described at 406. At 410, the mobility determination module 122 stores the determined mobility and activity levels in the wearer's profile.

At 412, the mobility determination module 122 determines an appropriate fall profile based on the wearer's height and current mobility and activity levels, as estimated at 406. This fall profile is then provided to the fall detection module, which activates it.

At 414, the mobility determination module 122 starts a time counter that it uses to determine when the wearer's mobility and activity should be next updated. At 416, the fall detection module 140 analyzes acceleration data to detect falls. The fall detection module 140 performs this analysis by comparing acceleration data to the most recently activated fall profile. At 418, the mobility determination module 122 determines whether the counter indicates that time p has elapsed since the counter was started at 412. If the counter does not so indicate, then the fall detection module 140 continues to use the active fall profile to detect falls. The use of the active fall profile is continued until the counter indicates that time p has elapsed, at which time a new activity and mobility determination is made, beginning with the retrieval of acceleration data specified at 404.

The monitoring device 100 of the present disclosure may include features for communicating with the wearer to determine the wearer's condition when a fall is detected. For example, when sensor data is indicative of a fall and the analysis performed by the fall detection module 140 indicates that a fall likely occurred, the communications/warnings module 123 may generate a message and prompt on the interface display screen 165. The message and prompt may be accompanied by a distracting sound for attracting the wearer's attention. Upon issuing the message and prompt, the communications/warnings module 123 may initiate a countdown clock.

The message serves to inform the wearer that the monitoring device 100 has detected the possibility of a fall and enables a wearer who has not fallen to indicate this fact. If such an input is not received by the time the countdown clock has expired, the monitoring device 100 transmits communications to a dispatch or emergency response service.

The monitoring device 100 is designed to operate in a mode in which the transmission of an alert is prevented by an input indicating that a fall has not occurred. In such a case, the monitoring device 100 resumes monitoring the user in the same manner as before the possibility of a fall was detected.

The monitoring device 100 also incorporates a further mode of operation in which a countdown timer is initiated upon receiving an input from a wearer indicating that a fall has not occurred. In this mode, the fall detection module 140 analyzes GPS, elevation and acceleration data for an indication of user movement. If the GPS, altitude and acceleration data are consistent with the wearer lying on the ground throughout the period during which the countdown clock is active, the monitoring device 100 solicits a second request for information from the wearer. On this occasion, if the wearer's input indicates that a fall has occurred, the monitoring device 100 then transmits an alert to dispatch or emergency services. The alert includes GPS information that represents the wearer's location, as well as elevation data so that, in case the wearer is in a tall building, emergency personnel can determine the floor on which the wearer is located.

The premise underlying this second mode of operation is that individuals may be in shock upon falling, or may initially be ashamed or hesitant to admit that they need help. In such cases, the second solicitation for information from the wearer serves to enable confirmation of the fall after the wearer's shock has subsided or after the wearer has recognized that help is necessary.

The device may also include an emergency communications feature that enables the wearer to trigger communications to a dispatch or emergency response service, regardless of whether a fall is detected by the monitoring device 100. For example, the monitoring device 100 may be designed so that this emergency communications feature can be activated by touching or pressing down on the display screen 165 for a threshold time duration.

The display screen 165 may provide an interface with functionality for reprogramming, calibrating or setting the monitoring device 100 in any number of ways. However, because such interfaces may be confusing, distracting or problematic for certain wearers, this control functionality may be hidden, so that it is only made apparent and accessible when a specific code or input has been provided. For example, the monitoring device 100 may be configured so that the control functionality is displayed only after the screen 165 has been touched, pressed, or tapped in a certain way.

At all other times, the screen shows a standard watch display, including the time of day. The monitoring device 100 may count strides taken by the wearer, and display this information on the screen 165, in combination with the time.

Figure 5:
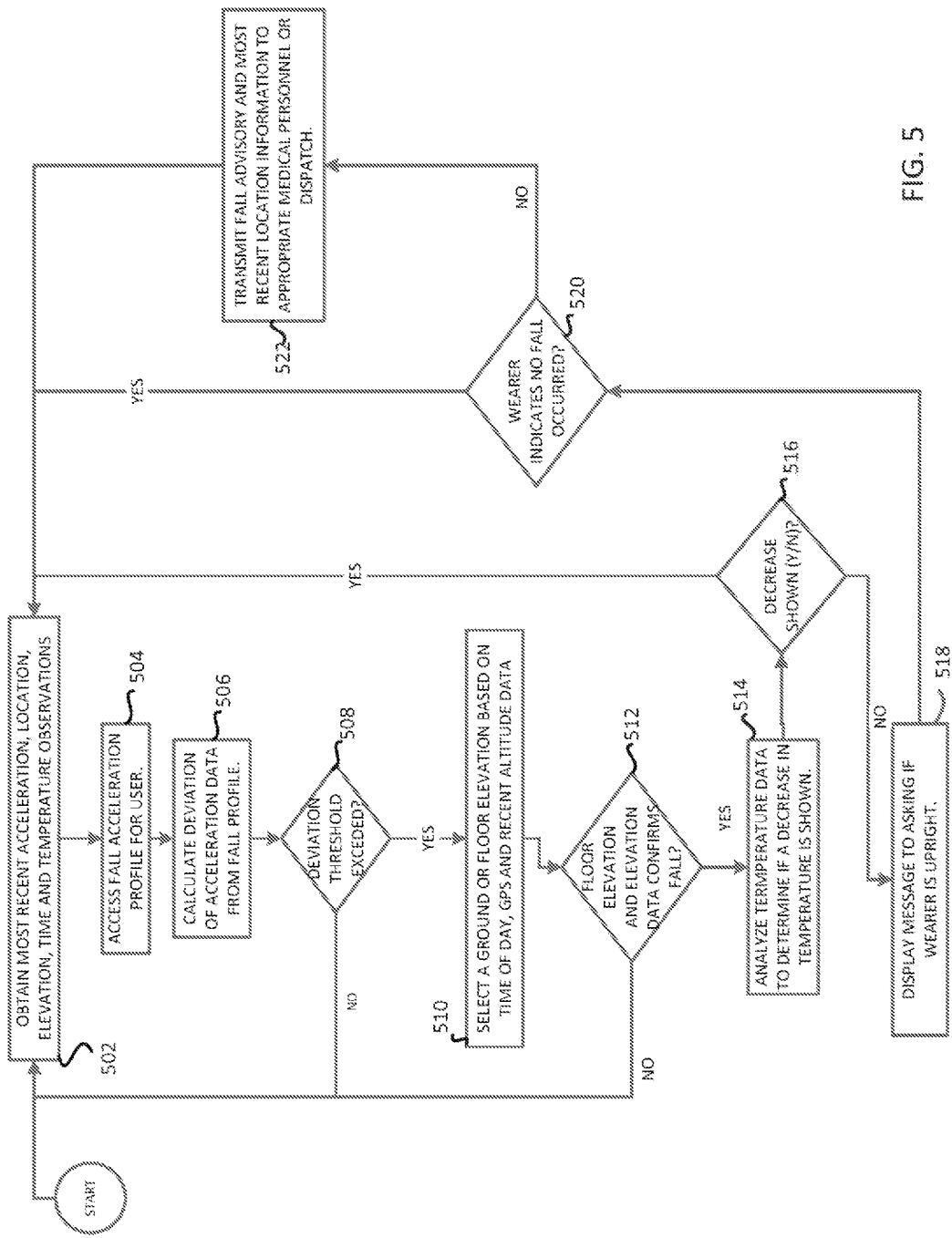
FIG. 5 is a flow chart illustrating an example sequence of fall detection operations that may be employed by the monitoring device disclosed herein.

FIG. 5 depicts an embodiment of generalized fall detection operations of the monitoring device 100. Specifically, FIG. 5 depicts one methodology by which the fall detection module 140 uses acceleration, elevation, and temperature data in the analysis performed in order to monitor the wearer's condition and detect falls. Additionally, FIG. 5 also depicts how the fall detection module 140 incorporates an activated fall profile and previously determined ground or floor elevation estimates in the monitoring process.

The depicted monitoring operations are begun at 502 by the fall detection module 140 obtaining most recent acceleration, location, altitude, time and temperature observations. At 504, the fall detection module 140 accesses the active fall acceleration profile stored within the wearer's profile. At 506, the fall detection module 140 calculates the deviation of the acceleration data from the fall profile.

At 508, the fall detection module 140 determines if the deviation calculated at 506 exceeds a similarity threshold. If the threshold is not exceeded, then the fall detection module 140 determines that the acceleration data is not indicative of a fall. In this case, the next step performed by the fall detection module 140 does not occur until subsequent acceleration data is registered. At this point, the fall detection module 140 obtains the most recent acceleration data, along with location altitude and time data, as depicted at 502, and the previously described steps are reiterated, as depicted.

However, if the fall detection module 140 determines that the deviation calculated at 506 does exceed the similarity threshold, then the acceleration data represents a possible fall, and the fall detection module 140 performs subsequent steps to confirm the possibility of a fall. For example, the fall detection module 140 selects an appropriate ground or floor altitude from the floor and surfaces data set 170, as depicted at 510. The fall detection module 140 selects an elevation based on the time of day, GPS data and recently observed elevation data. The selected elevation is chosen from amongst the surface and floor elevations previously determined and stored by the location and floor learning module 120. The manner in which the location and floor learning module 120 determines and stores surface and floor elevations will be described with reference to other drawings.

Subsequently, at 512, the fall detection module 140 determines whether the most recently registered altitude confirms the possibility of a fall detected at 508. This determination involves determining whether the most recently registered altitude data indicates that the wearer's elevation differs from the estimated floor or ground elevation by less than a threshold distance. If the difference is greater than the threshold, then the fall possibility hypothesis is rejected and the process reverts to step 502.

Conversely, if the difference is less than the threshold, the possibility of a fall is confirmed. In this case, the fall detection module analyzes temperature data at 514 to determine if a significant decrease in temperature is shown. If a substantial temperature decrease is shown (for example, if temperature decreases from approximately 98 degrees to 72 degrees, i.e. from body temperature to room temperature), then the fall possibility hypothesis is rejected because the drop in temperature is consistent with the monitoring device 100 having been detached from the wearer's body, and the acceleration data and altitude data that triggered the fall hypothesis at 506-508 and 512 is likely to be a result of the removal. In this case, the process reverts to step 502 so that subsequent monitoring can be performed on newly registered data.

However, if no such decrease is shown, then the fall detection module 140 activates the communications/warnings module 123 for the purpose of displaying a message which, as depicted at 516, asks the user if a fall has occurred. At this point, the interface display screen 165 is activated to receive a yes/no response from the user. When a response is received at 518 and the response confirms that a fall occurred, the communications/warnings module 123 activates an alert to be transmitted to medical personnel or an emergency dispatch service. This message includes the most recently obtained GPS location data and elevation data registered at the monitoring device 100, so as to assist emergency in locating the wearer.

Conversely, at 518, if the received response indicates that a fall has not occurred, the process continues at 502. In this way, the process repeats itself as new acceleration data is registered.

FIG. 6 displays an example representation of techniques that the monitoring device 100 may use to analyze altitude, acceleration and temperature data, in combination, for fall detection purposes. The time series sensor data depicted in FIG. 6 is hypothetical only, and is presented only for purposes of showing, in a highly generalized and simplified manner, certain of the characteristics and patterns that may accompany a fall and be utilized by the fall detection module 140 to detect the fall.

The portion of elevation data at 611 is roughly unchanged, thereby suggesting that the monitoring device 100 is worn on a single floor of a building or on some flat ground between the first and fifth depicted minute. Because the average elevation is 50 feet during this time, the floor and surfaces learning module 120 estimates a floor elevation of approximately 47.5 feet, with the exact estimate depending on the wearer's height.

As depicted at 604, upwards acceleration has occurred, followed by downwards acceleration. Simultaneously, as depicted at 610, elevation data increases rapidly and then stabilizes within a tight range of values shown at 601. These patterns are consistent with the monitoring device 100 being worn on a higher floor of the building. In response to this increase in elevation and subsequent narrow range of observations centered around 70 feet, the floor and surfaces learning module 120 estimates a new floor elevation of 67.5 feet.

At 603, sharp downwards acceleration occurs, followed shortly thereafter by sharp upwards acceleration. The downwards and upwards acceleration closely matches the fall profile selected for the wearer. In this case, the fall detection module 140 hypothesizes that a fall has occurred, and attempts to confirm the hypothesis by analyzing elevation and temperature data.

At 602, the elevation data reveals a quick drop in elevation, followed by a narrow range of elevation observations. If the observations within the narrow range coincide closely with a floor elevation estimate for the building in which the monitoring device is worn (as suggested by the graph at 602), the fall detection module 140 may determine that the elevation data confirms the fall. Next, the fall detection module 140 analyzes the temperature data that coincides with acceleration data 603. The analyzed temperature data is shown at 602, and reveals no significant decline in temperature. The temperature is consistently equal to or slightly above normal body temperature, and therefore suggests that the monitoring device 100 is being worn. Thus the fall hypothesis based on acceleration data is confirmed by temperature and elevation data in the example case of FIG. 6. Accordingly, in such a situation, the communications/warnings module 123 may use the interface 165 to solicit fall confirmation from the wearer. Additionally, the communications/warnings module 123 may schedule the transmission of an emergency alert in case the fall is confirmed or a response is not received.

As mentioned previously, the monitoring device 100 may, at times, operate in an elevation learning mode which facilitates determining the elevation of floors and surfaces in the wearer's home, office, yard and other locations where the wearer spends significant amounts of time. The learned elevation information may be used by the fall detection module 140 to confirm the possibility of a fall when acceleration data closely matches with the active fall profile.

The elevation learning mode refers to a continuous process of data gathering, storage and analysis that the monitoring device 100 may execute upon sensing that is within a building, or upon determining that GPS location data and elevation data has been generally unchanged for a substantial period of time. It may be preferable that the monitoring device 100 be configured to operate in the elevation learning mode only during these two situations. In that way, the elevation data registered during activities such as walking outdoors and riding in a car does not affect the analysis used to determine the elevation of surfaces and floors in the buildings or areas in which the wearer spends significant amounts of time (e.g. house, office, backyard). Unchanging GPS location data and elevation data is commonly registered when the monitoring device is being worn in an environment such as a backyard or park in which a wearer could fall without other people being present.

During the elevation learning mode, elevation data is repeatedly registered, stored in a time series format, and analyzed. For example, elevation observations are be incrementally added to a data structure as they are obtained. At the same time that elevation data is registered and stored, GPS, temperature and time data is also registered and stored in respective data structures in a manner that parallels the elevation data structure. When the data structures have been filled or some other data sufficiency criteria is satisfied, the location and floor learning module 120 then analyzes the data together. If the data reveals an elevation of a floor, the elevation is added to the floor and surface elevation dataset 170 as a data point. In the floor and elevation data set 170, the elevation data point is represented as a floor elevation observation and is indexed to the building or geographic location in which the data underlying the observation was registered.

Figure 7A:
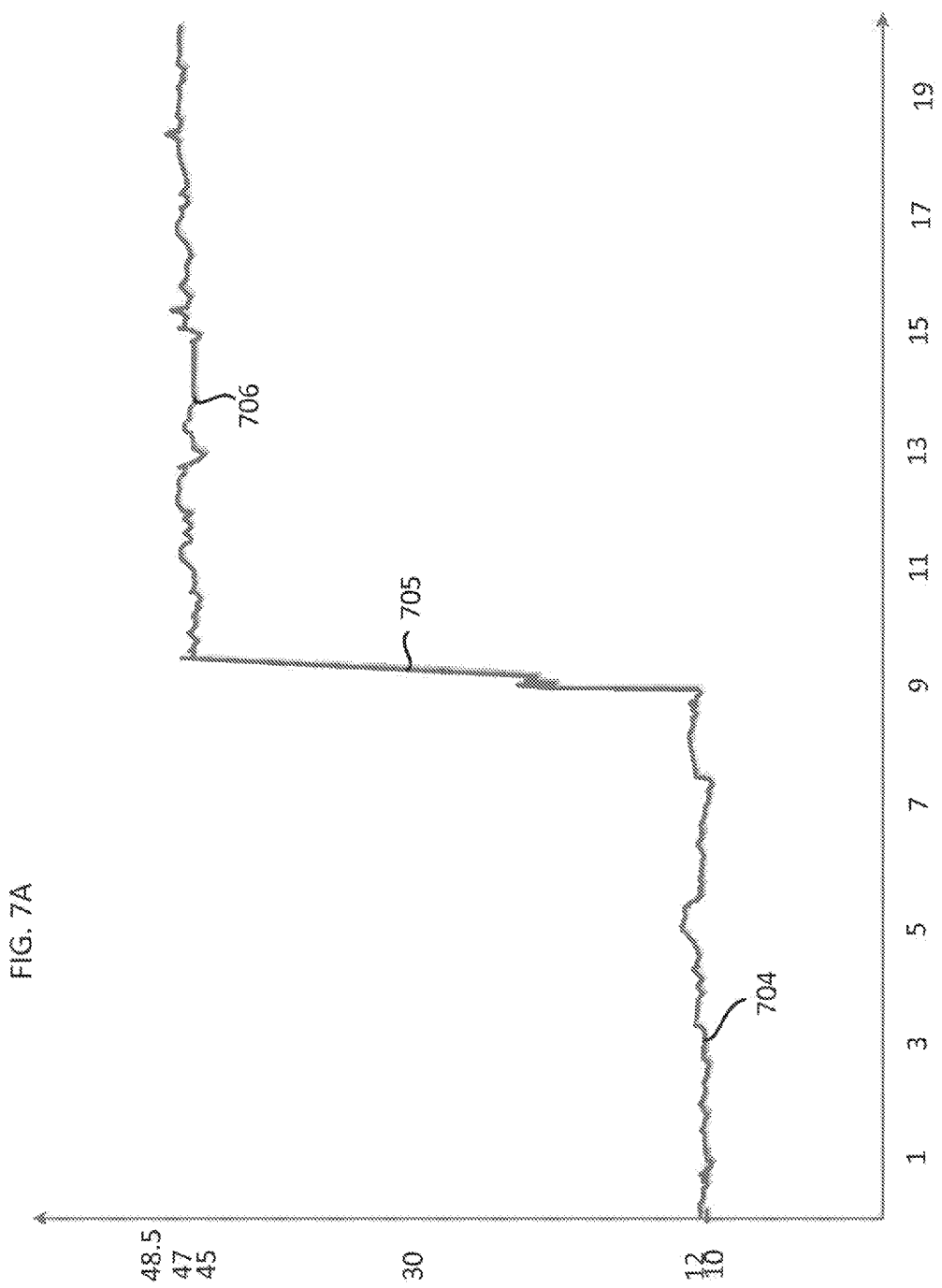
FIGS. 7A and 7B presents examples of patterns in elevation data which the monitoring device may recognize in order to determine elevations of surfaces and floors beneath a wearer.
Figure 7B:
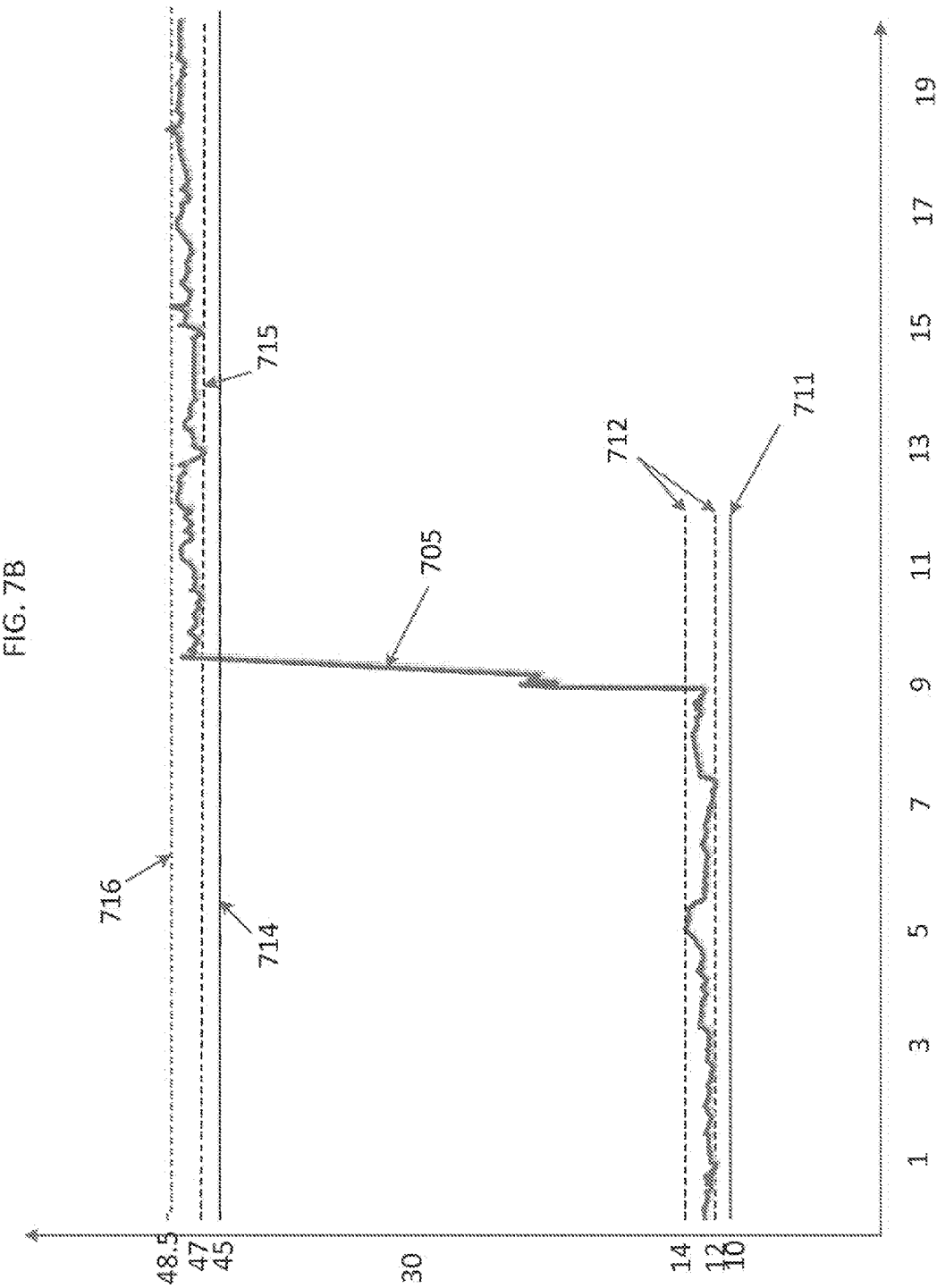

FIGS. 7A and 7B show visual representations of hypothetical elevation data to demonstrate how elevation data is gathered in the elevation learning mode and analyzed by the location and floor learning module 120 to learn the elevation of floors in a building. FIG. 7A is a time series display of elevation registered and stored over a course of 20 minutes, as indicated by the minute markings on the x-axis. Elevation observations are represented with respect to the y-axis, and various elevations (10, 12, 45, 47 and 48.5 feet are labeled on the y-axis). As may be understood by reference to data 704, the hypothetical elevation data indicates that the monitoring device 100 elevation varied within an approximately 2 foot range between the first elevation observation and the observation registered 9 minutes later. Subsequently, the elevation 705 of the monitoring device increased by approximately 35 within a 30 second period, starting at approximately the 9$^{th}$ minute of observations. After increasing rapidly, the elevation of the monitoring device stabilized at approximately 47 feet, and for the next 10 minutes the elevation 706 held steady within an approximately 1.5 foot range centered around 47 feet.

FIG. 7B is provided to show a generalized representation of the processing and analysis performed by the location and floor learning module. The analysis and processing is depicted with respect to the hypothetical elevation data of FIG. 7A, and is intended to show how learning steps and methods can be used to estimate floor elevations for the building in which elevation data is registered.

For example, FIG. 7A demonstrates how a location and floor learning module 120 scans the data so as to identify significant periods of time in which the majority of elevation observations fell within a single, narrow elevation range. Most individuals, when inside their home or building, rarely raise their wrists above their heads, and normally do so only momentarily. Similar, most people rarely move their wrists within approximately 1.5 feet of the ground, and when they do lower their wrists below that height, it is normally for a brief period of time. Thus, it is reliable to assume that the wearer's wrists will almost always be within approximately 2-5 feet of any home or office floor on which the wearer is present.

For this reason, the location and floor learning module 120 scans the data in search of a series of elevation observations in which the majority of observations fall within a 3 foot range. When such a range is found, the location and floor learning module 120 makes a floor elevation estimate based on the lower elevation of the range. For example, if a series of observations falls within 12-14 feet, as indicated at 712, a floor in the building is estimated to have an elevation of 10 feet.

Similarly, when the monitoring device 100 is being worn within a building, a rapid elevation change of at least 12 feet may be expected to coincide with walking up or down stairs or entering an elevator. Thus, for example, the location and floor learning module may deduce that the user has changed floors in response to detecting an increase in elevation, such as the increase depicted at 705. Moreover, such an elevation increase (or decrease) will normally be followed by a prolonged period of consistent elevation observations falling with another 2-5 foot range, as depicted by the lines at 715 and 716. The location and floor learning module 120 may be configured to scan for these additional 2-5 foot ranges, and to recognize such ranges as representative of user activity on a different floor of the building. The location and floor learning module makes additional floor elevation estimates when such ranges are found, so that floor elevation information may be used in monitoring the wearer's condition on various floors. For this reason, a line 714 at 45 feet is provided to demonstrate how the location and floor learning module 120 might use the range of observations falling between 47 and 48.5 feet. Thus, it should be understood that the location and floor learning module may be configured to learn multiple different floor elevations within any one building.

In addition to analyzing elevation data in the manner described with respect to FIG. 7B, the location and floor learning module 120 may additionally or alternatively perform multi-variable analysis to learn the elevations of floors and surfaces. For example, temperature data is analyzed in conjunction with contemporaneous elevation data to learn the elevations of table or countertop surfaces within a building. When a table or countertop surface elevation is learned, the elevation is used to confirm estimated elevations of floors in the building.

FIG. 8 depicts example elevation and temperature data patterns that the location and floor learning module scans for and uses to learn surface elevations. FIG. 8 shows 30 minutes of elevation data and contemporaneously registered temperature data. A first data pattern is the continuous and narrow (approximately 2-3 foot) range of elevation observations depicted at 801. As described previously with regards to FIG. 7A, patterns such as range 801 may be interpreted as resulting from the monitoring device being worn by a wearer who is involved in normal activity on a single building floor. The series of elevation data corresponding to range 801 is contemporaneous with a series of temperature observations 802 that fall within a narrow range centered around 98 degrees— the normal human body temperature. Thus, the location and floor learning module 120 may interpret temperature range to confirm that the monitoring device 100 is being worn, and that the wearer is involved in normal activity on a single floor of the building.

An additional data pattern begins at 803. This pattern is marked by the elevation observations becoming more consistent than in data pattern 801. Additionally, the pattern beginning at 803 is marked by the average elevation observation being approximately equal to the average elevation observation in data pattern 801. Data pattern 803 may be interpreted as being caused by the monitoring device 100 being removed from the wearer's body and being placed on a night stand, table or other surface having an elevation between 2-4 feet above the floor elevation.

An additional temperature data pattern 804 can be interpreted as confirming the interpretation of pattern 803. Temperature pattern 804 is characterized by a rapid fall in temperature, from 98 degrees (body temperature) to approximately 72 degrees (room temperature), followed by a series of temperature observations within a narrow observational range centered about approximately 72 degrees. Moreover, the time at which the fall in temperature was registered coincided with the beginning of pattern 803, at which time the elevation observations became more consistent.

The location and floor learning module 120 may make both floor and surface elevation estimates based on a series of data patterns such as 801, 802, 803, and 804. One manner of making such estimates is depicted in FIG. 9. Because removal of the monitoring device and placement on a nightstand or table is suggested by data pattern 803 following closely after pattern 801, and confirmed by temperature data pattern 804 following immediately after pattern 802, the location and floor learning module 120 may estimate a surface elevation directly from the elevations indicated by pattern 803. This estimation is represented by line 810, which directly coincides with the observations of data pattern 803. Line 810 is intended to show an estimated surface elevation of 21.5 feet.

Additionally, the location and floor learning module 120 may estimate a floor elevation based on the surface elevation 810 and the lower elevation of the range of observations associated with elevation data pattern 801. For example, based on an assumption that most nightstand tables stand 2 feet off the ground and an assumption that most people rarely move their wrists within 1.5 feet of the ground, data patterns 801 and 803 may be jointly interpreted as revealing that a floor at an elevation of 19.5 is immediately below the monitoring device 100. This floor elevation estimation is represented by the line at 811.

FIGS. 8 and 9, as described above, provide certain example data patterns that may be detected with respect to temperature data and used to determine floor and surface elevations. However, the scope of this disclosure is further intended to cover the detection and use of other data patterns and data pattern combinations which contain information about surface and floor elevations. These additional data patterns, although not specifically described herein, may be patterns involving other data besides elevation and temperature data. For example, GPS and time data may be used in conjunction with elevation data to make surface and floor estimates, and any such detectable and informative patterns as may be provided by such data shall be understood to be within the scope of this disclosure.

The location and floor learning module 120 may further include features enabling it to recognize noisy elevation data during the elevation learning mode, and determine that floor and surface elevation estimates should not be made because of the risk of unreliability. A noisy elevation data pattern of this sort is depicted at 1000 in FIG. 10. The time series elevation data pattern 1000 is distinguishable by the fact that it contains no continuous ranges of elevation observations falling within a 2-4 foot range. Moreover, the elevation changes are frequent and large. An elevation data pattern of this sort may be caused by changing environmental or building ventilation conditions, or by the user engaging in activity such as exercise or calisthenics. It may also be an indication that the monitoring device 100 is on a roadway or is no longer within a building.

The location and floor learning module 120 stores each floor and surface estimate in the floor and surfaces elevation data set 170. In this way, floor and surface estimates made in a same building may be used together to generate refined determinations of the floor and surface elevations, and the refined determinations are ultimately used in the fall detection process.

The location and floor learning module 120 may use clustering and averaging, or some other similar technique to generate the refined determinations. The clustering enables grouping of elevation estimates made with respect to a same surface or floor. For example, if the monitoring device 100 is used to monitor a wearer who lives on the third floor of an apartment having an elevation of 80 feet, the location and floor learning module 120 may make several elevation estimates of approximately 80 feet.

Hypothetically, the wearer might make frequent visits to a friend's apartment in the same building, 50 feet above the wearer's. In this case, the location and floor learning module 120 may make several elevation estimates of approximately 130 feet. The estimates that correspond to the friend's apartment should not be allowed to affect the refined determination of the floor elevation in the wearer's apartment, and vice versa. By clustering elevation estimates prior to generating a refined elevation determination, the location and floor learning module 120 ensures that elevation estimates made with respect to one floor or surface are not affected by estimates made with respect to another floor or surface.

Clustering analysis may involve grouping floor elevation observations using a clustering algorithm such as k-means, and separately grouping surface elevations using the same algorithm. When a cluster has a significant number of observations and is significantly focused (e.g. has a dense concentration of data), the average elevation estimate in the cluster is stored as a refined determination of either a floor or surface elevation.

Figure 11:
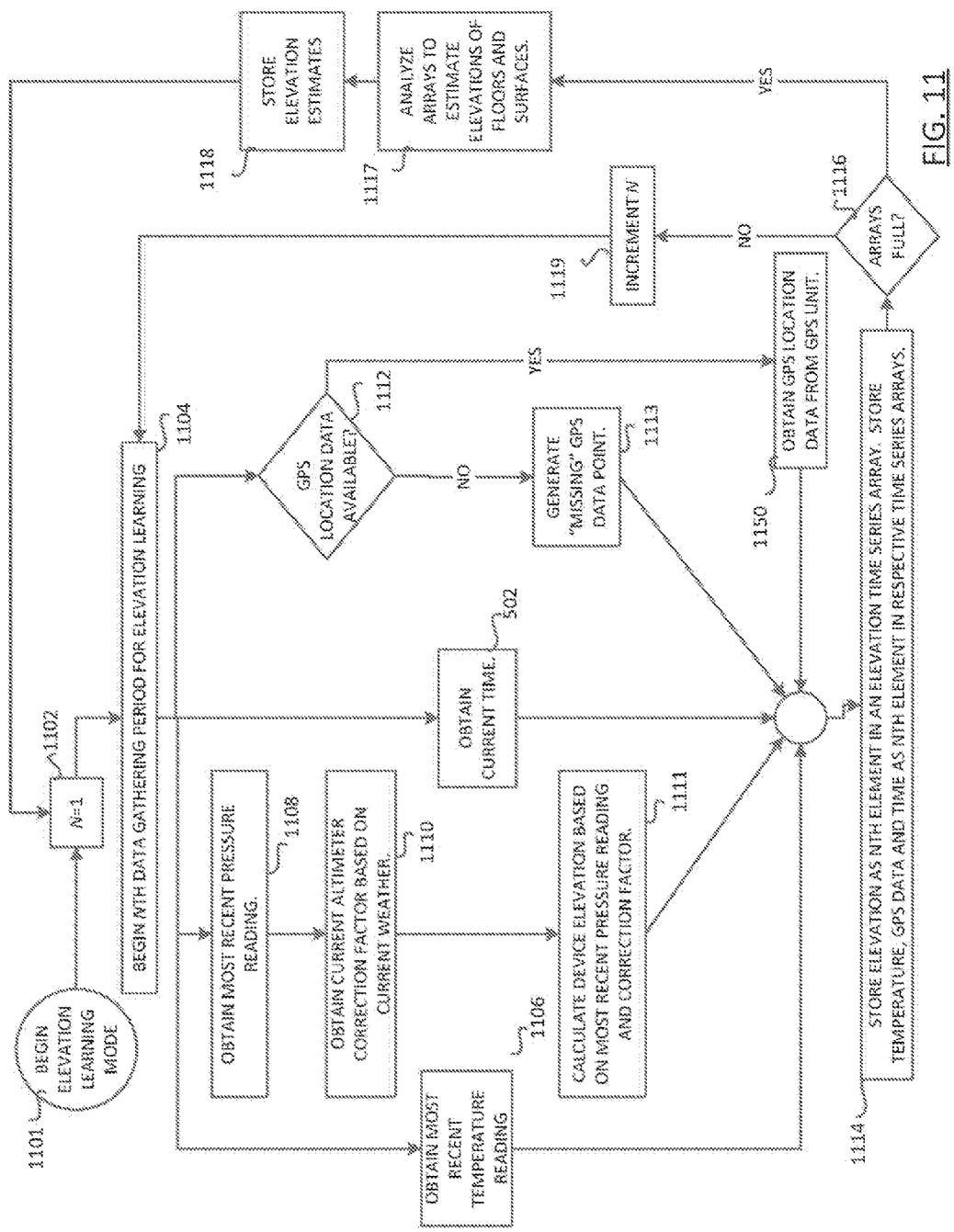
FIG. 11 is a flow chart illustrating an example sequence of operations that may be employed by the monitoring device while operating in the elevation learning mode.

FIG. 11 is a flow chart depicting an example sequence of operations that the monitoring device 100 uses to perform data gathering, storage, and analysis in the elevation learning mode. At 1101 the monitoring device 100 has already entered the elevation learning mode, and begins the data gathering and analysis process. A variable N is initialized to 1 at 1102. The variable N is a count variable that the monitoring device 100 uses to track how much data has been gathered so as to determine when data analysis may be performed. At 1104, the Nth data gathering period begins. The data gathering involves four parallel processes.

One of the processes involves accessing the most recent temperature reading provided by the thermometer, as depicted at 1106. A second parallel process involves obtaining the most recent pressure reading provided by the altimeter and the current altimeter correction factor based on the current weather, as shown at 1108 and 1110. The second parallel process further involves calculating the monitoring device 100 elevation based on the recent pressure reading and the correction factor, as shown at 1111.

The third parallel process is performed to obtain GPS data that is contemporaneous with the elevation data and temperature data registered in the second and third parallel process explained previously. However, GPS data is frequently unavailable in the indoor environment. Thus, at 1113, the monitoring device 100 generates a "missing" GPS data point if GPS data is determined to be unavailable at 1112. However, if the GPS location data is available, it is obtained for storage, as depicted at 1150. The fourth parallel process involves determining the current time for the purpose of time stamping the GPS, elevation and temperature data.

At 1114, the elevation data is stored as the Nth element in an elevation time series array, or other similar time series data structure. Also, at 1114, the monitoring device 100 stores the most recent temperature, GPS data and time data in respective time series arrays.

At 1116, if the arrays are not yet full, then the parallel data gathering and storage steps are repeated again, starting at step 1106. The process repeats until the arrays are filled. When the monitoring device 100 determines that the arrays are full at 1116, then the location and floor learning module 120 analyzes the arrays for any data patterns that suggest the elevation of a floor or surface. The location and floor learning module 120 makes elevations estimates if suitable data patterns exists, as depicted at 1117. If elevation estimates are made, they are stored in the floor and surfaces elevation data set, as depicted at 1118, and are used in combination with previous estimates made in the same building for the purpose of generating refined elevation determinations (not shown in FIG. 11). Subsequently, the entire data gathering, storage and analysis process may be repeated.

Figure 12:
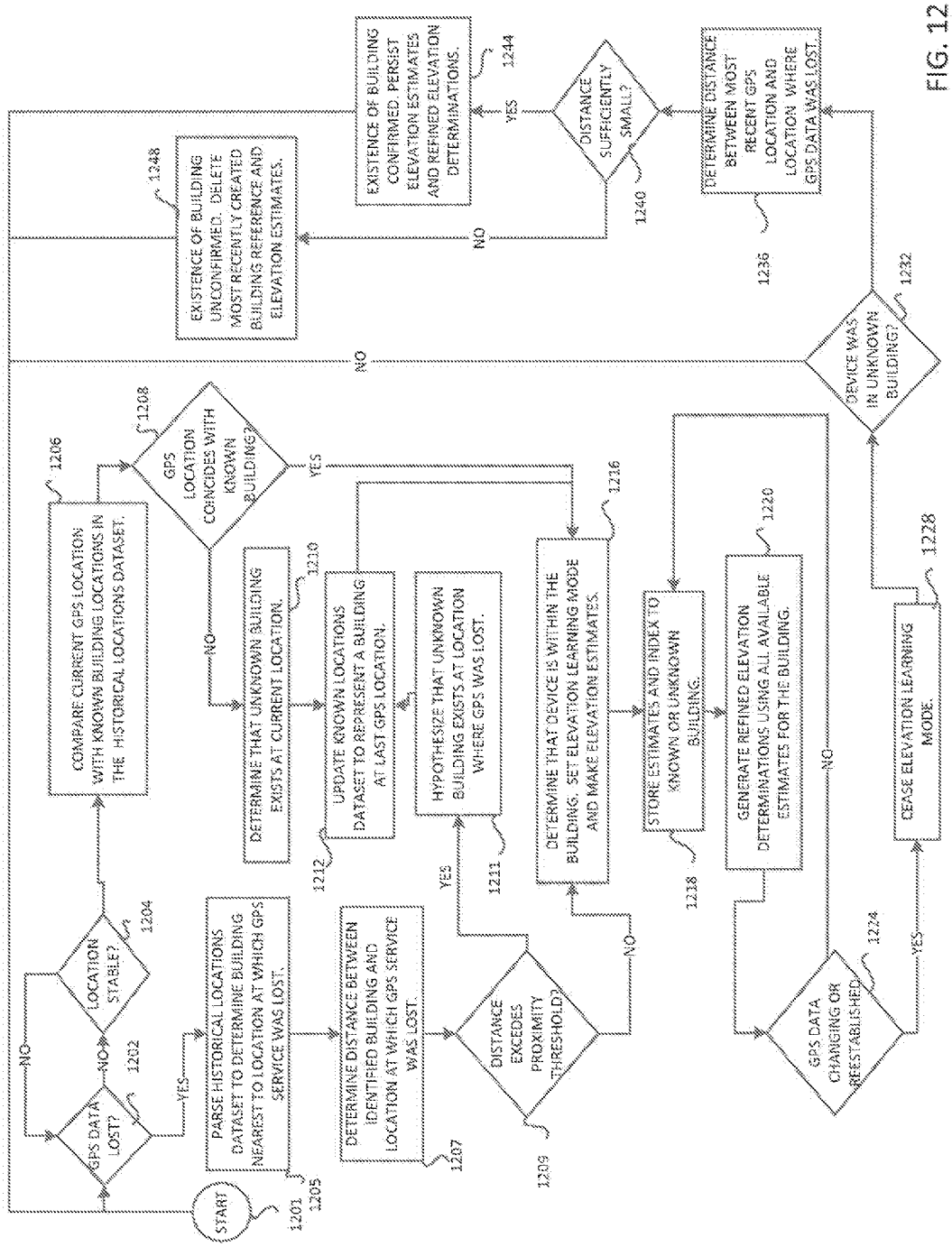
FIG. 12 is a flow chart illustrating an example sequence of building detection and elevation learning operations that may be employed by the monitoring device.

FIG. 12 is a flow chart that provides a simplified depiction of example operations that the monitoring device 100 may use to learn the locations of buildings, detect when it has been brought into a building, and activate and deactivate the elevation learning mode as appropriate.

The example operations depicted in FIG. begin at 1201. At 1202 and 1204, if GPS data is not lost and the GPS data indicates the monitoring device 100 position is generally unchanging, the location and floor learning module 120 compares the current GPS location with the locations of known buildings in the historical locations data set 180. This comparison is depicted at 1206. At 1208, if the GPS location does not coincide with a known building, the location and floor learning module 120 hypothesizes, as depicted at 1210, that an unknown building exists at the current monitoring device location. Subsequently, at 1212, the location and floor learning module 120 updates the historical locations dataset 180 so as to include a reference to the hypothesized building.

A different operational sequence may alternatively lead to step 1212. As depicted at 1205, if GPS data is lost at 1202, the location and floor learning module 120 parses the historical locations dataset 180 to determine the known building located closest to where GPS data was lost. At 1207, the locations and floors learning module 120 determines the distance between this known building and the location at which GPS data was lost. At 1209, the distance is compared to a proximity threshold. If the distance exceeds the threshold, then locations and floors learning module 120 hypothesizes that an unknown building exists at the location where GPS data was lost. Step 1212 is then executed in response.

Conversely, if the distance is less than the threshold at 1209, the location and floor learning module 120 determines that the monitoring device 100 is within the known building that was referenced as part of the comparison at 1207. Accordingly, the elevation learning mode is activated, and elevation estimates are made at 1216. At 1218, the location and floor learning module 120 stores elevation estimates in the floor and surfaces data set 170. The observations are indexed to the known or unknown building, whichever the case may be. At 1220, the refined elevation determinations are made using all available elevation estimates indexed to the building. The elevation learning mode then continues, with steps 1218-1220 being continuously repeated in sequence. Ad depicted at 1224 the repetition of steps 1218-1220 continues until either the GPS indication becomes unstable (for example, the wearer gets in a car and leaves the building) or GPS date again becomes available if it had previously been unavailable.

At 1228, the elevation learning mode is ceased because either resumption of GPS service or rapidly changing GPS data indicates that the wearer may have left the building. At 1232, if the monitoring device 100 had sensed that it was in a building that had been recognized from the historical locations data set 170, the process reverts to 1202, and GPS data is further analyzed to detect building reentry, or entry into a different building.

However, if the location and floor learning module 120 had hypothesized (at 1210 or 1211) an unknown building, then a series of additional checks are made which help confirm that presence within a building was accurately sensed. For example, at 1236 the location and floor learning module 120 compares the distance between the most recent GPS location and the location where GPS data was lost. At 1240, if this distance is sufficiently small, then the hypothesized building is confirmed. Accordingly, the elevation estimates and refined elevation determinations made at 1216-1220 are persisted in memory. If, at 1240, the distance is not sufficiently small, then the existence of the hypothesized building is unconfirmed. For this reason, the elevation estimates and refined elevation determinations are deleted. Regardless of the outcome at 1240, the entire process of FIG. 12 is continuously reiterated, as depicted by the arrows returning to step 1202.

Specific details are given in the above description to provide a thorough understanding of the various embodiments of the described methods, techniques and systems. However, it is understood that certain such embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure

What is claimed is:

1. A wrist-worn apparatus configured to facilitate monitoring a wearer of the apparatus, the apparatus comprising:
    a first sensor configured to generate elevation data that represents an elevation of the apparatus, the elevation data being time series data that represents the elevation of the apparatus at various times;
    a second sensor configured to collect temperature data of the wearer;
    a processor configured to:
        determine, based on the elevation data, and the temperature data, elevations of multiple surfaces in a building,
        detect, based on a particular surface elevation of the elevations of the multiple surfaces in the building and the temperature data of the wearer, an emergent situation affecting the wearer;
    a third sensor configured to provide data representative of a geographical location of the apparatus; and
    a transmitter configured to:
        transmit an initial alert to emergency personnel in response to the processor detecting the emergent situation;
        transmit a secondary alert to emergency personnel in response to the third sensor providing data within a pre-set time period of determining the emergent situation and the processor determining the floor location of the apparatus within the pre-set time period,
    wherein the alert includes the data provided by the third sensor and the floor location of the apparatus.

2. The apparatus of claim 1, further comprising:
    a fourth sensor configured to generate acceleration data that represents a magnitude of acceleration of the apparatus,
    wherein the processor detecting an emergent situation affecting the wearer includes:
        determining, based on the elevation data, an elevation of a floor surface located underneath the wearer and that the apparatus is vertically displaced from the floor surface by less than a threshold distance; and
        determining that the acceleration data satisfies a fall condition.

3. The apparatus of claim 2, wherein the processor detecting an emergent situation affecting the wearer further includes:
    determining that a portion of the acceleration data is similar to an acceleration profile determined based on testing or modeling, wherein the acceleration profile is determined based on a height input that represents the height of the wearer.

4. The apparatus of claim 2, wherein the processor is further configured to:
    determine a different elevation of the floor surface located underneath the wearer, in response to changes in the elevation data generated by the first sensor.

5. The apparatus of claim 1, the apparatus further comprising:
    an interface that facilitates activating an emergency communications feature, and
    wherein the processor detecting an emergent situation affecting the wearer includes:
        determining that the emergency communications feature is activated.

6. The apparatus of claim 1, further comprising:
    a receiver configured to receive weather information, wherein the processor is configured to generate a control signal based on the weather information, and wherein the first sensor is configured to generate elevation data based on ambient pressure and the control signal.

7. The apparatus of claim 1, wherein the processor detecting an emergent situation affecting the wearer further includes:
    determining that the temperature data collected by the second sensor exceeds a pre-set maximum value or is less than a pre-set minimum value.

8. The apparatus of claim 7, wherein the second sensor is a thermometer and the temperature data is a body temperature of the wearer.

9. The apparatus of claim 1, wherein the initial alert is a voice-call transmitted via a cellular network.

10. The apparatus of claim 1, wherein the secondary alert is a text message transmitted via a cellular network.

11. The apparatus of claim 1, wherein the processor determining the elevations of the multiple surfaces in a building includes:
    determining, based on at the data provided by the third sensor, that the apparatus is within a building;
    storing data provided by the third sensor as time series data that represents the geographical location of the apparatus at various times.

12. A wrist-worn apparatus configured to facilitate monitoring a wearer of the apparatus, the apparatus comprising:
    a first sensor configured to generate a first signal used to determine an elevation of the apparatus;
    a second sensor configured to generate a second signal used to determine a geographic location of the apparatus;
    a third sensor configured to generate a third signal used to detect a body temperature of the wearer;
    a processor configured to:
        determine a floor location of the apparatus with respect to each of multiple floors in a building, wherein determining a floor location is based on the first signal and the second signal; and
        determine multiple floor elevations corresponding to the multiple floors of the building based on the first signal and the third signal;
        detect, based on the third signal and at least one floor elevation of the multiple floor elevations, an emergent situation affecting the wearer;
    a transmitter configured to:
        transmit an initial alert in response to the processor detecting an emergent situation affecting the wearer; and
        transmit a secondary alert that includes the geographic location of the apparatus and the floor location of the apparatus.

13. The apparatus of claim 12, further comprising:
an interface that facilitates activating an emergency communications transmission by touching the interface,
wherein the processor detecting an emergent situation affecting the wearer includes:
detecting that the emergency communications transmission is activated.

14. The apparatus of claim 12, wherein the processor detecting an emergent situation affecting the person further includes:
determining that the temperature of the wearer, based on the third signal collected by the third sensor, exceeds a pre-set maximum value or is less than a pre-set minimum value.

15. The apparatus of claim 12, the processor configured to transmit a second alert includes:
receiving the second signal from the second processor in response to detecting the emergent situation affecting the wearer; and
determining the floor location in response to detecting an emergent situation affecting the person.

16. The apparatus of claim 12, wherein the secondary alert is a text message transmitted via a cellular network.

17. A method for monitoring a wearer of a wrist-worn device, the wrist-worn device having multiple sensors disposed therein, and the method comprising:
generating elevation data that represents an elevation of the device, the elevation data being time series data that represents the elevation of the device at various times;
generating temperature data that represents a temperature of the wearer;
determining, based on the elevation data and the temperature data, an elevation of a floor located underneath the wearer;
determining, based on elevations of multiple floors in a building and the wearer visiting the multiple floors, a floor location of the device;
generating location data the represents a geographical location of the device;
detecting, based on at least one of the multiple sensors, an emergent situation affecting the wearer; and
transmitting an initial alert in response to detecting an emergent situation affecting the wearer; and
transmitting a secondary alert that includes the location data and the floor location of the device.

18. The method of claim 17, wherein the initial alert is a voice-call transmitted via a cellular network.

19. The method of claim 17, wherein the secondary alert is an SMS message transmitted via a cellular network.

20. The method of claim 17, further comprising: generating by a fourth sensor acceleration data that represents a magnitude of acceleration of the apparatus,
wherein detecting an emergent situation affecting the wearer includes:
determining, based on the elevation data, an elevation of a floor surface located underneath the wearer and that the apparatus is vertically displaced from the floor surface by less than a threshold distance.

* * * * *